(12) United States Patent
Arasaki et al.

(10) Patent No.: US 10,298,069 B2
(45) Date of Patent: May 21, 2019

(54) WIRELESS POWER RECEIVING DEVICE AND WIRELESS POWER TRANSMISSION DEVICE

(71) Applicant: TDK CORPORATION, Tokyo (JP)

(72) Inventors: Kota Arasaki, Tokyo (JP); Masahide Ohnishi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 86 days.

(21) Appl. No.: 15/559,173

(22) PCT Filed: Mar. 30, 2016

(86) PCT No.: PCT/JP2016/060415
§ 371 (c)(1),
(2) Date: Sep. 18, 2017

(87) PCT Pub. No.: WO2016/159093
PCT Pub. Date: Oct. 6, 2016

(65) Prior Publication Data
US 2018/0090995 A1    Mar. 29, 2018

(30) Foreign Application Priority Data

Mar. 31, 2015    (JP) .................................. 2015-073435

(51) Int. Cl.
*H02J 50/12*    (2016.01)
*H02H 9/04*    (2006.01)
(Continued)

(52) U.S. Cl.
CPC ............. *H02J 50/12* (2016.02); *H02H 9/041* (2013.01); *H02M 3/33576* (2013.01);
(Continued)

(58) Field of Classification Search
CPC ..................................................... H02J 50/12
See application file for complete search history.

(56) References Cited

U.S. PATENT DOCUMENTS

| 6,037,745 A | 3/2000 | Koike et al. |
| 2014/0306545 A1* | 10/2014 | Robertson ............... H02J 50/12 |
| | | 307/104 |

(Continued)

FOREIGN PATENT DOCUMENTS

| JP | H11-27870 A | 1/1999 |
| JP | 2014-033499 A | 2/2014 |

OTHER PUBLICATIONS

Jun. 14, 2016 International Search Report issued in International Patent Application No. PCT/JP2016/060415.
(Continued)

*Primary Examiner* — Fritz M Fleming
(74) *Attorney, Agent, or Firm* — Oliff PLC

(57) ABSTRACT

A wireless power receiving device, for wirelessly receiving electric power from a wireless power feeding device, includes: a power receiving side resonant circuit having a power receiving coil wirelessly receiving power from a power feeding side and a power receiving side resonant capacitor; a rectifier circuit in which the power received by the power receiving coil is rectified to be output to a load; a power receiving side voltage detecting portion for detecting the output voltage of the rectifier circuit; a short circuit having a switching element connected between an output portion of the power receiving side resonant circuit and an output portion of the rectifier circuit, and a rectifying element inserted between the output portion of the power receiving side resonant circuit and the switching element; and a controlling circuit which operates the switching element when a value of the output voltage exceeds a preset reference voltage value.

17 Claims, 13 Drawing Sheets

(51) Int. Cl.
*H02M 3/335* (2006.01)
*H02J 50/80* (2016.01)
*B60L 11/18* (2006.01)
*H02J 7/02* (2016.01)

(52) U.S. Cl.
CPC .............. *B60L 11/182* (2013.01); *H02J 7/025* (2013.01); *H02J 50/80* (2016.02)

(56) References Cited

U.S. PATENT DOCUMENTS

| | | | | |
|---|---|---|---|---|
| 2014/0372780 | A1* | 12/2014 | Murai | H02J 50/12 713/323 |
| 2015/0280455 | A1* | 10/2015 | Bosshard | H02J 50/12 307/104 |
| 2018/0062445 | A1* | 3/2018 | Hwang | H02J 50/12 |

OTHER PUBLICATIONS

Jun. 14, 2016 Written Opinion issued in International Patent Application No. PCT/JP2016/060415.

* cited by examiner

WIRELESS POWER RECEIVING DEVICE AND WIRELESS POWER TRANSMISSION DEVICE

The present invention relates to a wireless power receiving device and a wireless power transmission device.

BACKGROUND

In recent years, wireless power transmission device is proposed as a technology for charging a rechargeable battery of an electric vehicle. There are several types of wireless power transmission device, and in particular, a magnetic resonance method is used for the above-mentioned application.

As such a wireless power transmission device, for example, Patent Document 1 proposes a wireless power feeding system having an inverter circuit, a first LC parallel resonance portion, a second LC parallel resonance portion and a rectifier circuit, wherein, the inverter circuit inverts a direct current power into an alternating current power and transmits to a power feeding coil, the first LC parallel resonance portion is formed by a power feeding coil and a first capacitor provided in parallel with the power feeding coil, the second LC parallel resonance portion is formed by a power receiving coil and a second capacitor provided in parallel with the power receiving coil, and the rectifier circuit converts an alternating current power received from the power receiving coil into a direct current power.

Meanwhile, it is known that, in the wireless power transmission device, malfunction such as overvoltage may occur during power feeding, and a protection circuit is equipped to protect the circuit element from such malfunction. For example, Patent document 2 proposes a short circuit using a switching element for protecting a rectifier circuit from overvoltage. The short circuit disclosed in Patent document 2 monitors an output voltage of the rectifier circuit and operates the switching element to cause a short circuit when the output voltage exceeds a preset reference voltage value and thus protect circuit elements deposed in a stage following the rectifier circuit from the overvoltage. A semiconductor element is used as the switching element used in the short circuit.

PATENT DOCUMENT

Patent Document 1: JP2014-033499A
Patent Document 2: JP H11-027870A

SUMMARY

However, the semiconductor element used as the switching element disclosed in Patent document 2 structurally has a parasitic capacitance. This parasitic capacitance forms a loop connected to two ends of a power receiving side resonant circuit in a state that the switching element is turned off, and a reactive power is generated caused by a current flowing through the parasitic capacitance, thereby causing a problem of deteriorating the power factor. In other words, if it is attempted to obtain the same power, a larger amount of current must be flowed and thus a power loss is generated.

The present invention has been made in view of the above problems, and it is aimed to provide a wireless power receiving device and a wireless power transmission device which protects circuit elements when an overvoltage occurs and suppresses generation of power loss due to reactive power during normal operation.

A wireless power receiving device according to the present invention is a wireless power receiving device which wirelessly receives electric power from a wireless power feeding device, comprising: a power receiving side resonant circuit provided with a power receiving coil wirelessly receiving power from a power feeding side and a power receiving side resonant capacitor connected to the power receiving coil; a rectifier circuit in which the power received by the power receiving coil is rectified to be output to the load; a power receiving side voltage detecting portion for detecting the output voltage of the rectifier circuit; a short circuit provided with a switching element connected between an output portion of the power receiving side resonant circuit and an output portion of the rectifier circuit, and a rectifying element inserted between the output portion of the power receiving side resonant circuit and the switching element; and a controlling circuit which operates the switching element when the value of the output voltage detected by the power receiving side voltage detecting portion exceeds a preset reference voltage value.

According to the present invention, the switching element of the short circuit will be operated when the value of the output voltage detected by the power receiving side voltage detecting portion exceeds a preset reference voltage value. Therefore, two ends of the power receiving coil of the power receiving side resonant circuit are short-circuited. As a result, the generated overvoltage cannot be output to the stage following the power receiving side resonant circuit and thus the circuit elements deposed in a stage following the power receiving side resonant circuit can be protected. In addition, since a rectifying element is inserted between the output portion of the power receiving side resonant circuit and the switching element, the current path to the parasitic capacitance of the switching element is cut off and the discharge of the parasitic capacitance is suppressed. As a result, generation of power loss due to reactive power during normal operation can be suppressed.

Preferably, the rectifier circuit can be provided with a bridge type circuit in which four diodes are full bridge connected and a smoothing capacitor which is connected in parallel with the bridge type circuit. In this case, the efficiency of the power supply can be improved.

Preferably, the controlling circuit is configured to transmit a stop signal for stopping the power feeding operation to the wireless power feeding device at the same time as or immediately after the controlling circuit operates the switching element. In this case, when the value of the output voltage detected by the power receiving side voltage detecting portion exceeds a preset reference voltage value, the operation of the wireless power feeding device is stopped, so that it is possible to protect the circuit elements of entire wireless power transmission device. In addition, as the operation of the wireless power feeding device is stopped, the period for applying a current to the short circuit is suppressed, so that the short circuit can be protected.

Preferably, a transforming circuit can be further provided between the output portion of the power receiving side resonant circuit and the input portion of the rectifier circuit. In this case, it is possible to protect the circuit elements when an overvoltage occurs and output a desired voltage/current from one power receiving side resonant circuit by changing the transformation ratio of the transforming circuit during normal operation.

Preferably, an inductor circuit is further provided between the output portion of the power receiving side resonant circuit and the input portion of the rectifier circuit. In this case, it is possible to protect the circuit element when an overvoltage occurs and suppress noise during normal operation.

The wireless power transmission device according to the present invention comprises the wireless power receiving device mentioned above and a wireless power feeding device. According to the present invention, it is possible to provide a wireless power transmission device which protects circuit elements when an overvoltage occurs and suppresses generation of power loss due to reactive power during normal operation.

According to the present invention, it is possible to provide a wireless power receiving device and a wireless power transmission device which protect circuit elements when an overvoltage occurs and suppress generation of power loss due to reactive power during normal operation.

BRIEF DESCRIPTION OF THE DRAWINGS

FIG. 5b is a partially enlarged view of a circuit configuration diagram showing a current path when the switching element of the short circuit in FIG. 1 is turned on.

FIG. 8b is a partially enlarged view of a circuit configuration diagram showing a current path when the switching element of the short circuit in FIG. 7 is turned on.

DETAILED DESCRIPTION OF EMBODIMENTS

The embodiments for carrying out the present invention will be described in detail with reference to the drawings. In addition, the same symbols will be used for the same elements or the elements having the same functions, and repeated description will be omitted.

The First Embodiment

Figure 1:
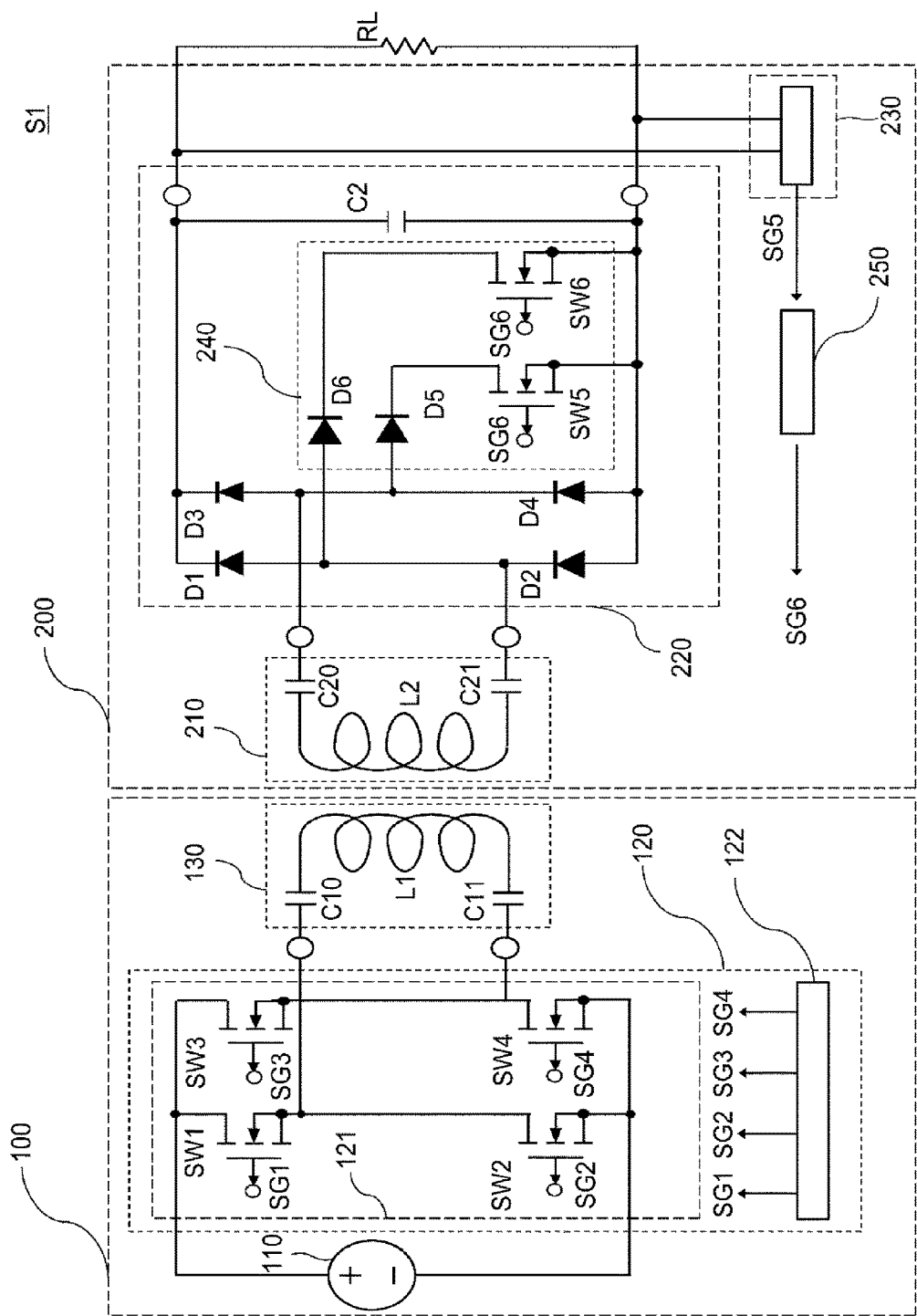
FIG. 1 is a circuit configuration diagram showing a wireless power transmission device according to a first embodiment of the present invention together with a load.

First, with reference to FIG. 1, the configuration of wireless power transmission device S1 according to the first embodiment of the present invention will be described. FIG. 1 is a circuit configuration diagram showing a wireless power transmission device according to the first embodiment of the present invention together with a load.

As shown in FIG. 1, wireless power transmission device S1 is provided with wireless power feeding device 100 and wireless power receiving device 200.

Wireless power feeding device 100 comprises power supply 110, power inverter circuit 120 and power feeding side resonant circuit 130. Power supply 110 supplies a direct current power to power inverter circuit 120. Power supply 110 is not particularly limited as long as it outputs direct current power, and may be a direct current power supply obtained by rectifying and/or smoothing a commercial alternating current power supply, or a switching power supply device such as a switching converter or the like.

Power inverter circuit 120 comprises power inverter portion 121 and switch driving portion 122. This power inverter circuit 120 has a function of inverting a direct current power supplied from power supply 110 into alternating current power. More specifically, power inverter portion 121 is configured by a switching circuit in which a plurality of switching elements are bridge-connected. In the present embodiment, the circuit is a full bridge type circuit using four switching elements SW1 to SW4. As examples of the switching elements SW1 to SW4, elements such as MOSFET (Metal Oxide Semiconductor-Field Effect Transistor) or IGBT (Insulated Gate Bipolar Transistor) can be listed. Referring to each of switching elements SW1 to SW4, the input direct current power supplied from power supply 110 is inverted to an alternating current power by on/off controlling each of switching elements SW1 to SW4 in accordance with the SW control signals SG1 to SG4 provided by switch driving portion 122. The alternating current power inverted by power inverter circuit 120 is supplied to power feeding coil L1 described later.

Power feeding side resonant circuit 130 comprises power feeding coil L1 and power feeding side resonant capacitors C10 and C11. Power feeding coil L1 is formed using a litz wire obtained by twisting a plurality of thin conductor strands or a single wire. As power feeding coil L1, for example, a planar coil or a solenoid coil or the like can be listed. The power feeding coil L1 forms an LC resonant circuit together with power feeding side resonant capacitors C10 and C11. Power feeding side resonant capacitors C10 and C11 are formed by connecting a plurality of capacitors in series and parallel and have a function of adjusting the resonance frequency of the LC resonant circuit. Power feeding side resonant capacitor C10 is connected in series with one end of power feeding coil L1 and power feeding side resonant capacitor C11 is connected in series with the other end of power feeding coil L1. As examples of the capacitors used as power feeding side resonant capacitors C10 and C11, a ceramic capacitor or the like can be listed. Further, in the present embodiment, the power feeding side resonant capacitors C10 and C11 are connected in series with power feeding coil L1 respectively, but the present invention is not limited thereto. For example, it can be formed that only power feeding side resonant capacitor C10 connects in series with power feeding coil L1, or only power feeding side resonant capacitor C10 connects in parallel with power feeding coil L1, or power feeding side resonant capacitor C10 connects in series and power feeding side resonant capacitor C11 connects in parallel with power feeding coil L1. Power feeding coil L1 of power feeding side resonant circuit 130 configured in this way wirelessly transmits an alternating current power inverted by power inverter circuit 120 to wireless power receiving device 200 described later.

Wireless power receiving device 200 comprises power receiving side resonant circuit 210, rectifier circuit 220, power receiving side voltage detecting portion 230, short circuit 240, and controlling circuit 250. Here, power feeding side resonant circuit 130 of wireless power feeding device 100 and power receiving side resonant circuit 210 of wireless power receiving device 200 are magnetically coupled. The alternating current power supplied to power feeding coil L1 of power feeding side resonant circuit 130 from power inverter circuit 120 excites an induced electromotive force in aftermentioned power receiving coil L2 of power receiving side resonant circuit 210 by the proximity magnetic field effect. That is, wireless power receiving device 200 wirelessly receives power from wireless power feeding device 100.

Power receiving side resonant circuit 210 comprises power receiving coil L2 and power receiving side resonant capacitors C20 and C21. Power receiving coil L2 is formed using a litz wire obtained by twisting a plurality of thin conductor strands or a single wire. As power receiving coil L2, a planar coil, a solenoid coil, or the like can be listed. This power receiving coil L2 forms an LC resonant circuit together with power receiving side resonant capacitors C20 and C21. Power receiving side resonant capacitors C20 and C21 are formed by connecting a plurality of capacitors in series and parallel, and have a function of adjusting the resonance frequency of the LC resonant circuit. Power receiving side resonant capacitor C20 is connected in series with one end of power receiving coil L2 and power receiving resonant capacitor C21 is connected in series with the other end of power receiving coil L2. As the examples of the capacitors used as the power receiving side resonant capacitors C20 and C21, a ceramic capacitor or the like can be listed. In the present embodiment, power receiving side resonant capacitors C20 and C21 are connected in series with power receiving coil L2, respectively, but the present invention is not limited thereto. For example, it can be formed that only power receiving side resonant capacitor C20 connects in series with power receiving coil L2 or only power receiving side resonant capacitor C20 connects in parallel with power receiving coil L2, or power receiving side resonant capacitor C20 connects in series and power receiving side resonant capacitor C21 connects in parallel with power receiving coil L2. Power receiving coil L2 of power receiving side resonant circuit 210 configured as described above wirelessly receives the alternating current power from wireless power feeding device 100.

Rectifier circuit 220 rectifies the power received by power receiving coil L2 of power receiving side resonant circuit 210 and outputs the rectified power to load RL. In the present embodiment, rectifier circuit 220 is composed of a bridge type circuit and smoothing capacitor C2 connected in parallel with the bridge type circuit, wherein, in the bridge type circuit four diodes (rectifying elements) D1 to D4 are connected in a full bridge. That is, rectifier circuit 220 has a function of full-wave rectifying an alternating current power supplied from power receiving side resonant circuit 210. In the present embodiment, a bridge type circuit is formed by one output end of power receiving side resonant circuit 210 being connected to the midpoints between the anode of diode D1 and the cathode of diode D2, and the other output end of power receiving side resonant circuit 210 being connected to the midpoints between the anode of diode D3 and the cathode of diode D4. Smoothing capacitor C2 smoothes the rectified voltage to generate a direct current voltage. In the present embodiment, rectifier circuit 220 employs a full-wave rectifier circuit, but it is not limited to this. It can be formed by a half-wave rectifier circuit having one diode and a smoothing capacitor connected in parallel with the cathode of the diode, or a center tap circuit having two diodes and a smoothing capacitor connected in parallel with the cathodes of each of the two diodes. When rectifier circuit 220 is composed of a full-wave rectifier circuit, the utilization efficiency of the power supply can be improved.

Power receiving side voltage detecting portion 230 detects the output voltage of rectifier circuit 220. More specifically, the output voltage of rectifier circuit 220 is converted into a low voltage signal using methods such as voltage division/amplification, and the output voltage is detected using this signal. Power receiving side voltage detecting portion 230 compares a preset reference voltage value with the detected output voltage and transmits output signal SG 5 to controlling circuit 250 which will be described later when the output voltage exceeds the reference voltage value.

Short circuit 240 has a function of causing tow ends of the power receiving coil L2 to be short-circuited when the output voltage of rectifier circuit 220 detected by power receiving side voltage detection portion 230 exceeds a preset reference voltage value. Specifically, short circuit 240 has a function of causing diode D2 and diode D4 to be short-circuited. Short circuit 240 performs a short circuit operation based on driving signal SG6 transmitted from controlling circuit 250. Short circuit 240 is composed of switching elements SW5 and SW6 and rectifying elements D5 and D6.

Switching elements SW5 and SW6 are connected between the output portion of power receiving side resonant circuit 210 and the output portion of rectifier circuit 220. More specifically, switching element SW5 is connected in parallel with diode D4, and switching element SW6 is connected in parallel with diode D2. Switching elements SW5 and SW6 have a function of turning on/off in response to driving signal SG6 received from controlling circuit 250 described later. That is, when the switching elements SW5 and SW6 are turned on, the diodes D2 and D4 are short-circuited, and no voltage is generated in rectifier circuit 220. Conversely, when switching elements SW5 and SW6 are turned off, rectifier circuit 220 functions as a full-wave rectifier circuit in which the four diodes D1 to D4 are connected in a full bridge connection. Although MOS-FETs are used as the switching elements SW5 and SW6 in the present embodiment, the switching elements SW5 and SW6 are not limited to this, and may be elements such as IGBTs, for example.

Rectifying elements D5 and D6 are inserted between the output portion of power receiving side resonant circuit 210 and switching elements SW5 and SW6. As rectifying elements D5 and D6, diodes can be listed. In the present embodiment, rectifying element D5 is connected in series with switching element SW5. The anode of rectifying element D5 is connected to the input portion of the bridge type circuit, i.e., the cathode of diode D4, and the cathode of rectifying element D5 is connected to the drain of switching element SW5. Rectifying element D6 is connected in series with switching element SW6. The anode of rectifying element D6 is connected to the input part of the bridge circuit, i.e., the cathode of diode D2, and the cathode of rectifying element D6 is connected to the drain of switching element SW6.

Controlling circuit 250 controls the operation of short circuit 240. Specifically, upon reception of output signal SG5 from power receiving side voltage detecting portion 230, it controls the operation so as to provide driving signal SG6 to switching elements SW5 and SW6 and turn on switching elements SW5 and SW6.

Figure 2:
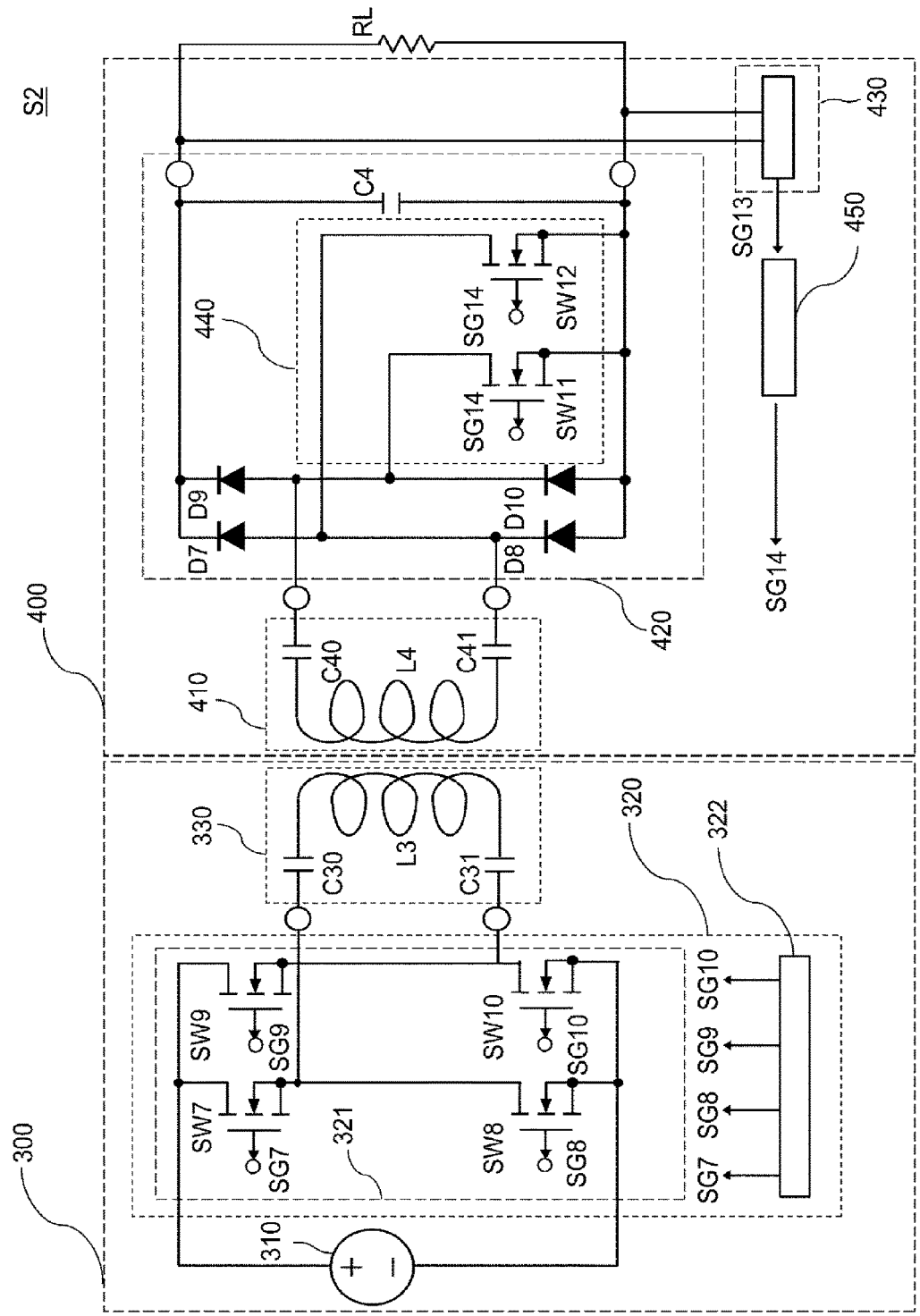
FIG. 2 is a circuit configuration diagram showing a wireless power receiving device according to a conventional wireless power transmission device together with a load.
Figure 3:
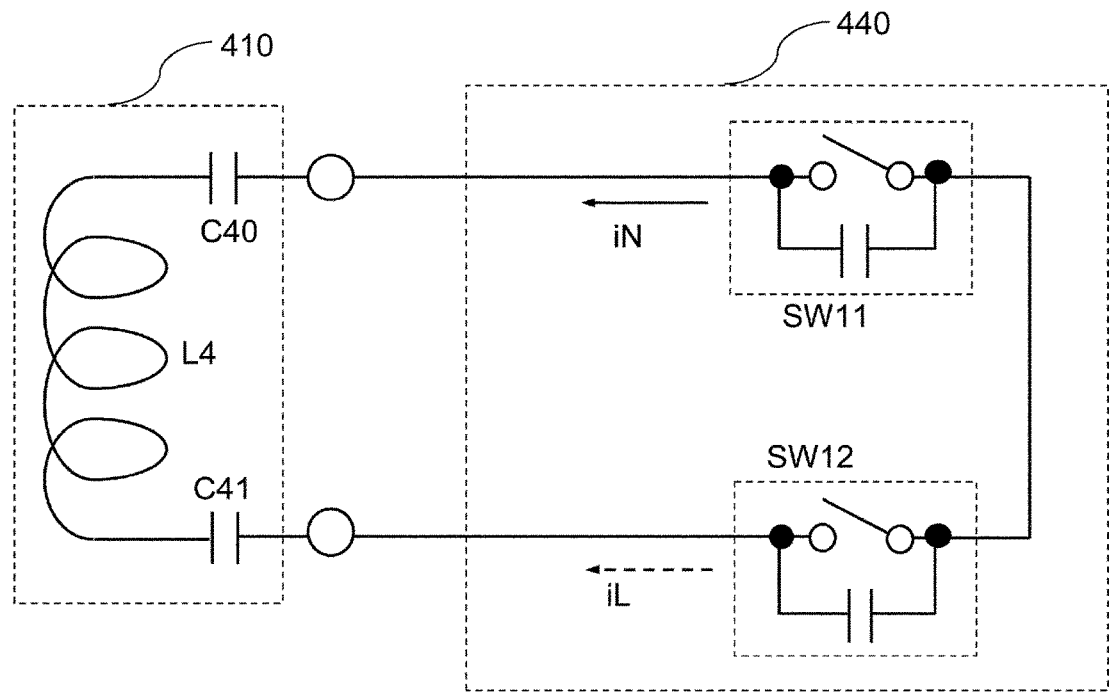
FIG. 3 is a partially enlarged view of a circuit configuration diagram showing a current path formed by a closed loop of a power receiving side resonant circuit and a short circuit in FIG. 2.
Figure 4:
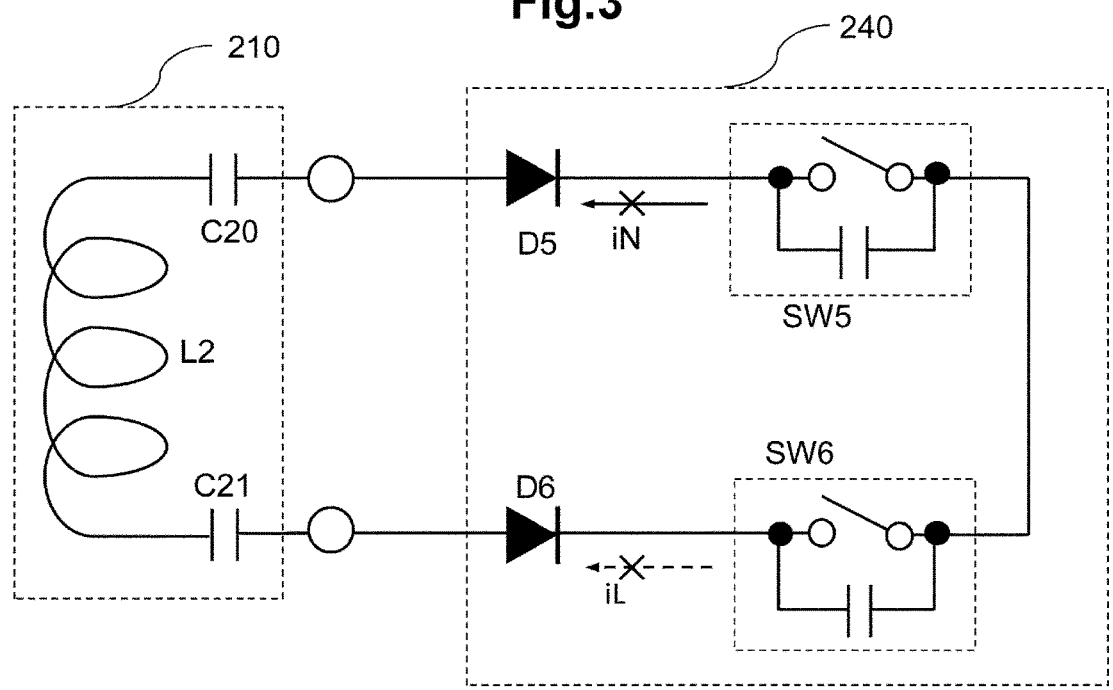
FIG. 4 is a partially enlarged view of a circuit configuration diagram showing a current path formed by a closed loop of a power receiving side resonant circuit and a short circuit in FIG. 1.

Next, referring to FIG. 2~4, the difference between the current path in the closed loop formed by power receiving side resonant circuit 210 and short circuit 240 in wireless power transmission device S1 according to the first embodiment of the present invention and the current path in the closed loop formed by power receiving side resonant circuit 410 and short circuit 440 in the conventional wireless power transmission device S2 will be described in detail. FIG. 2 is a circuit configuration diagram showing a wireless power receiving device according to a conventional wireless power transmission device together with a load. FIG. 3 is a partially enlarged view of a circuit configuration diagram showing a current path formed by a closed loop of a power receiving side resonant circuit and a short circuit when the switching element is turned off in FIG. 2. FIG. 4 is a partially enlarged view of a circuit configuration diagram showing a current path formed by a closed loop of a power receiving side resonant circuit and a short circuit when the switching element is turned off in FIG. 1. Herein, switching elements SW5, SW6, SW11, and SW12 are shown as equivalent models formed by parallel connection of the parasitic capacitance of the switching elements and the switches.

First, the configuration of the conventional wireless power transmission device S2 will be described. As shown in FIG. 2, the conventional wireless power transmission device S2 comprises wireless power feeding device 300 and wireless power receiving device 400. Wireless power feeding device 300 comprises power supply 310 for supplying a direct current power to power inverter circuit 320, power inverter circuit 320 for inverting a direct current power to an alternating current power, and power feeding side resonant circuit 330 for wirelessly feeding the alternating current power from power feeding coil L3, wherein, power inverter circuit 320 is composed of power inverter portion 321, in which four switching elements SW7 to SW10 are bridge-connected, and switch driving portion 322 providing SW controlling signals SG7 to SG10 to control the on/off operation of switching elements SW7 to SW10, and power feeding side resonant circuit 330 is composed of power feeding coil L3 and power feeding side resonant capacitors C30 and C31. Wireless power receiving device 400 comprises power receiving side resonant circuit 410 receiving an alternating current power wirelessly fed from wireless power feeding device 300 by power receiving coil L4; rectifier circuit 420 rectifying the received alternating current power; power receiving side voltage detecting portion 430 for detecting the value of the output voltage of rectifier circuit 420; short circuit 440 making the two ends of power receiving side resonant circuit 410 short-circuited; and controlling circuit 450 controlling the operation of short circuit 440, wherein, power receiving side resonant circuit 410 is composed of power receiving coil L4 and power receiving side resonant capacitors C40 and C41, and rectifier circuit 420 is composed of a bridge type circuit in which four diodes D7 to D10 are full-bridge connected and a smoothing capacitor C4 connected in parallel with the bridge type circuit. Short circuit 440 is composed of switching element SW12 connected to the cathode of diode D8 of rectifier circuit 420 and switching element SW11 connected to the cathode of diode D10, and controlling circuit 450 provides driving signal SG14 to switching elements SW11 and SW12 upon reception of output signal SG13 from power receiving side voltage detecting portion 430 and controls switching elements SW 11 and SW 12 to be turned on.

As shown in FIG. 3, in the conventional wireless power transmission device S2, currents $I_L$ and $I_N$ flowing from power receiving side resonant circuit 410 forms a flow path through switching elements SW11 and SW12 and returning to power receiving side resonant circuit 410 again because there is no interception in the flow of the current. At this time, current flow through the parasitic capacitances of switching elements SW11 and SW12, so that a reactive power is generated and the power factor is deteriorated. In other words, if it is attempted to obtain the same power, a larger amount of current must be flowed, so power loss is generated. On the other hand, as shown in FIG. 4, in wireless power transmission device S1 according to the first embodiment of the present invention, referring to currents $I_L$ and $I_N$ flowing from power receiving side resonant circuit 210, the path to switching elements SW5 and SW6 is cut off by diodes D5 and D6 of short circuit 240, and the discharge of parasitic capacitance does not occur. This is equivalent to open circuit, and currents $I_L$ and $I_N$ do not flow to switching elements SW5 and SW6. Therefore, generation of reactive power due to parasitic capacitances of switching elements SW5 and SW6 can be suppressed. Therefore, generation of power loss due to reactive power during normal operation can be suppressed. Further, in the case that the power receiving side resonant circuit is formed by a series-connected resonant circuit, a resonance frequency deviation occurs due to the parasitic capacitance during the normal operation. However, in the present embodiment, as the current path to power receiving side resonant circuit 210 via the parasitic capacitance is cut off by rectifying elements D5 and D6, the influence on the resonant frequency of power receiving side resonant circuit 210 due to the parasitic capacitances of the switching elements SW5 and SW6 can be suppressed.

Figure 5A:
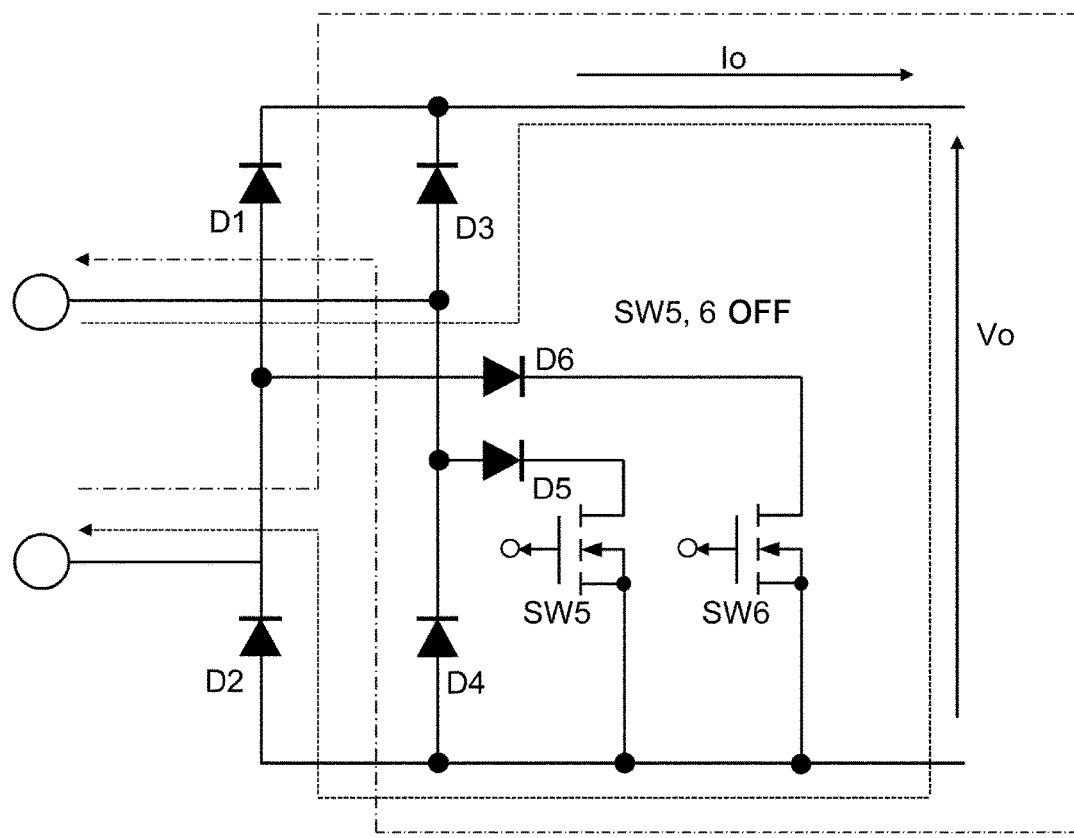
FIG. 5a is a partially enlarged view of a circuit configuration diagram showing a current path when the switching element of the short circuit in FIG. 1 is turned off.
Figure 5B:
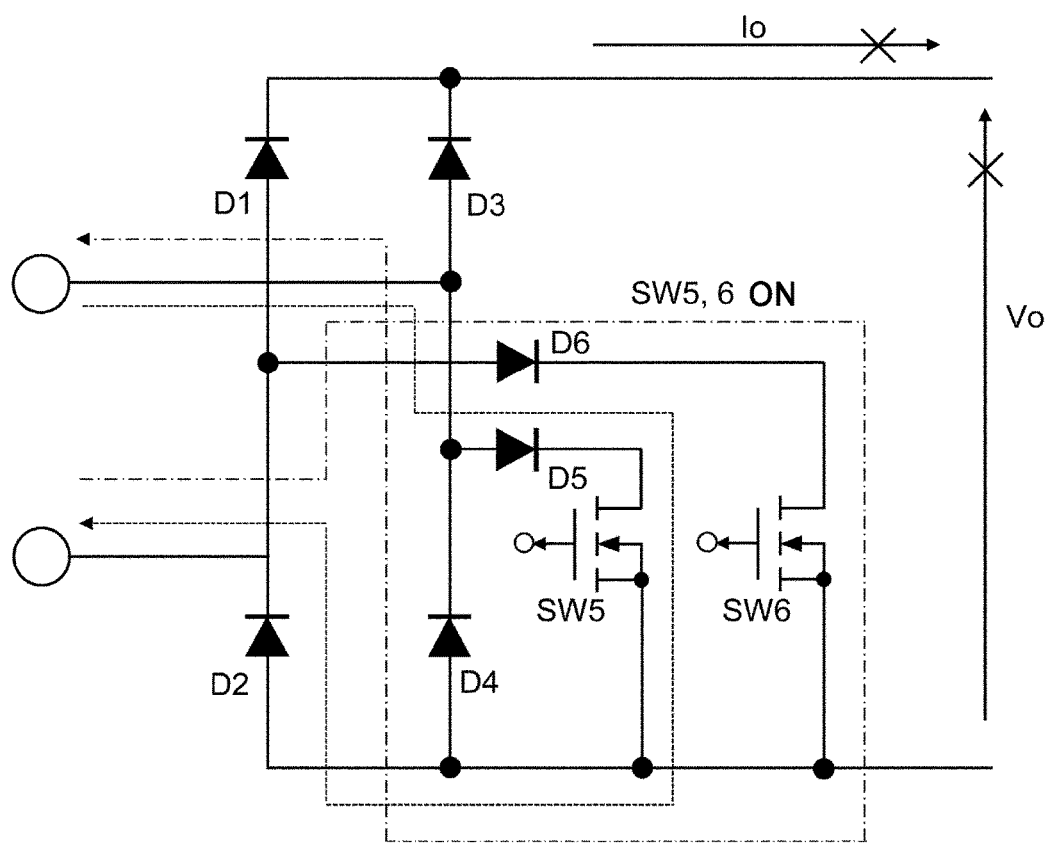

Subsequently, with reference to FIGS. 5a and 5b, the current path in the case that switching elements SW5 and SW6 of short circuit 240 are ON and in the case that the switching elements SW5 and SW6 are OFF in wireless power transmission device S1 according to the first embodiment of the present invention is described. FIG. 5a is a diagram showing a current path flowing in the rectifier circuit and the short circuit when the switching element of the short circuit in FIG. 1 is turned off. FIG. 5b is a diagram showing a current path flowing in the rectifier circuit and the short circuit when the switching element of the short circuit in FIG. 1 is turned on.

First, the OFF state of switching elements SW5 and SW6 will be described. As shown in FIG. 5a, in the current paths of the alternating current flowing through rectifier circuit 220, one of the current paths is a path starting from power receiving coil L2 and returning back through diode D1, smoothing capacitor C2 and load RL, diode D4. And the other one of the current paths is a path starting from power receiving coil L2 and returning back through diode D3, smoothing capacitor C2 and load RL, diode D2. At this time, in both current paths of the alternating current flowing through rectifier circuit 220, no current flows to short circuit 240 due to the function of diodes D5 and D6 as described above.

Subsequently, the ON state of switching elements SW5 and SW6 will be described. As shown in FIG. 5b, in the current paths of the alternating current flowing through rectifier circuit 220, one of the current paths is a path starting from power receiving coil L2 and returning back through diode D5, switching element SW5 and diode D2, and the other one of the current paths is a path starting from power receiving coil L2 and returning back through diode D6, switching element SW6, and diode D4. In this case, since no current flows through the output of rectifier circuit 220, it is possible to protect the circuit elements deposed in a stage following rectifier circuit 220 from malfunction.

Figure 6:
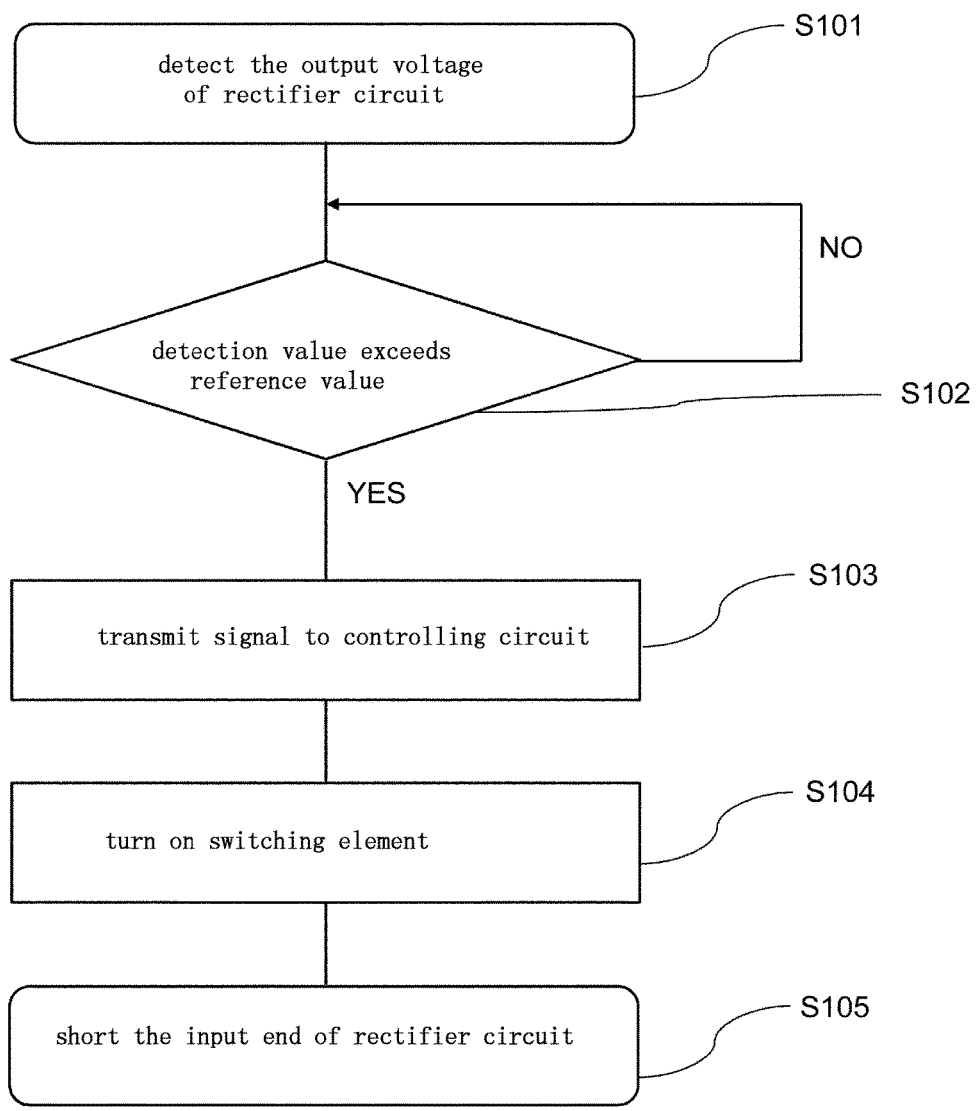
FIG. 6 is a flowchart showing a protection operation of the wireless power transmission device according to the first embodiment of the present invention.

Next, with reference to the flowchart of FIG. 6, the protection operation during the malfunction of wireless power transmission device S1 according to the present embodiment will be described in detail. FIG. 6 is a flowchart showing the protection operation of the wireless power transmission device according to the first embodiment of the present invention.

First, in wireless power transmission device S1, when power transmission starts wirelessly from wireless power feeding device 100 to wireless power receiving device 200, the value of the output voltage of rectifier circuit 220 can be always detected by power receiving side voltage detecting portion 230 (Step S101).

Subsequently, the power receiving side voltage detecting portion 230 compares the value of the output voltage detected in step S101 with a preset reference voltage value (Step S102).

As the result of comparing the value of the output voltage detected in step S101 with the preset reference voltage value, when the value of the output voltage detected in step S101 exceeds the preset reference voltage value (step S102Y), output signal SG5 from power receiving side voltage detecting portion 230 is output to controlling circuit 250 (Step S103). On the other hand, as the result of comparing the value of the output voltage detected in step S101 with the preset reference voltage value, when the value of the output voltage detected in step S101 does not exceed the preset reference voltage value (step S102N), the process returns to step S101, and the operations from step S101 to step S102 are repeatedly executed.

Subsequently, upon receiving output signal SG5, controlling circuit 250 provides driving signal SG6 to switching elements SW5 and SW6, and controls switching elements SW5 and SW6 to be turned on (Step S104).

Subsequently, when switching elements SW5 and SW6 are controlled to be ON, diodes D2 and D4 of rectifier circuit 220 are short-circuited (Step S105). Since diodes D2 and D4 of rectifier circuit 220 are short-circuited by switching elements SW5 and SW6, the current path from power receiving side resonant circuit 210 is divided into a path starting from diode D5 and returning back to power receiving side resonant circuit 210 through switching element SW5 and diode D2 and a path starting from diode D6 and returning back to power receiving side resonant circuit 210 through switching element SW6 and diode D4. At this time, no current flows through the output side of rectifier circuit 220, so that it is possible to protect the circuit elements deposed in a stage following rectifier circuit 220 from malfunction.

As described above, in wireless power transmission device S1 according to the present embodiment, when the value of the output voltage detected by power receiving side voltage detecting portion 230 exceeds a preset reference voltage value, switching device SW5 and SW6 of short circuit 240 are operated. Therefore, diodes D2 and D4 of rectifier circuit 220 are short-circuited. As a result, the generated overvoltage will not be output to the stage following power receiving side resonant circuit 210, and the circuit elements deposed in a stage following power receiving side resonant circuit 210 can be protected. In addition, since rectifying elements D5 and D6 inserted between the output portion of power receiving side resonant circuit 210 and switching elements SW5 and SW6 are provided, the current path to the parasitic capacitance of switching elements SW5 and SW6 is cut off, and discharge of the parasitic capacitance is suppressed. As a result, generation of power loss due to reactive power during normal operation can be suppressed.

The Second Embodiment

Figure 7:
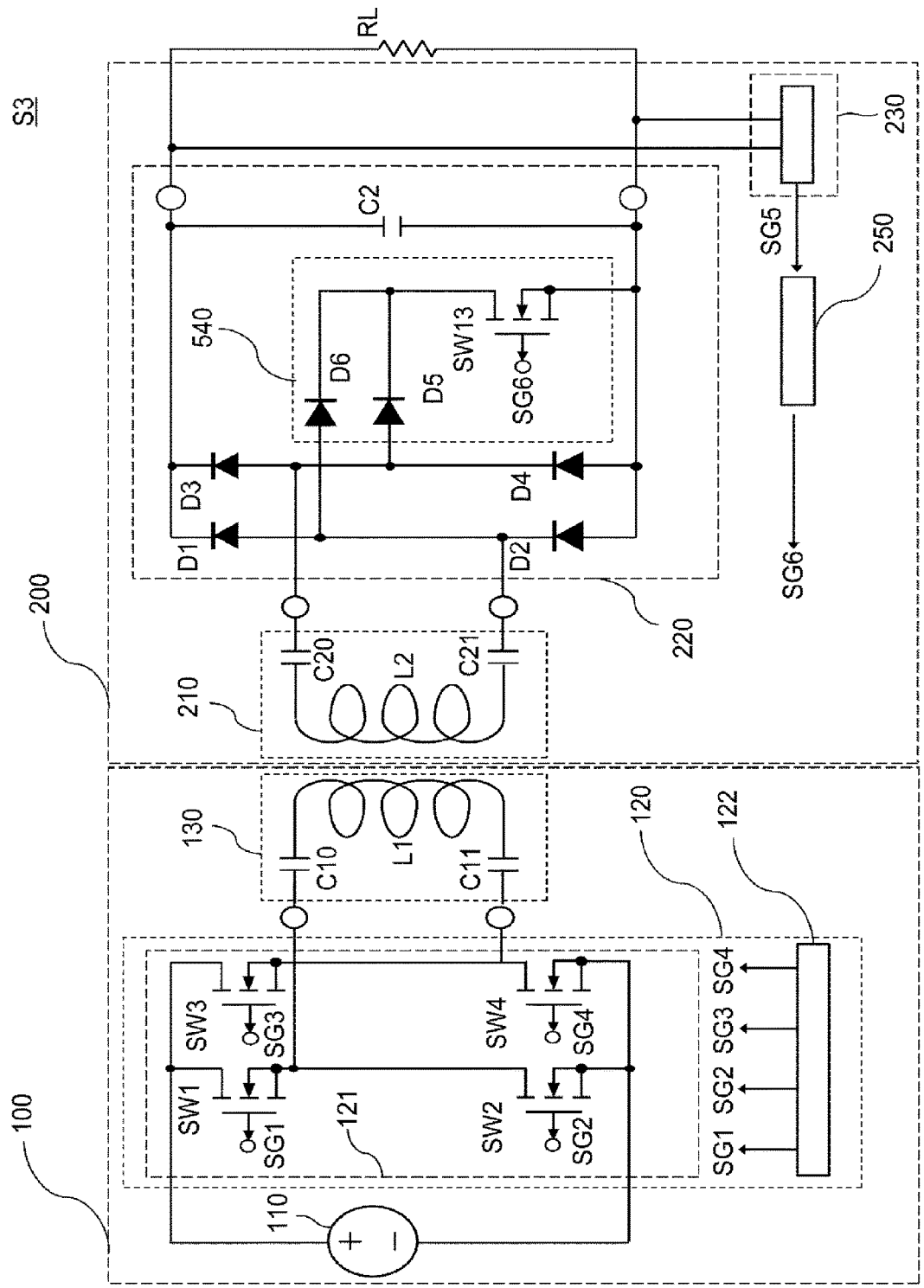
FIG. 7 is a circuit configuration diagram showing a wireless power transmission device according to the second embodiment of the present invention together with a load.

First, with reference to FIG. 7, the configuration of wireless power transmission device S3 according to the second embodiment of the present invention will be described. FIG. 7 is a circuit configuration diagram showing a wireless power transmission device according to the second embodiment of the present invention together with a load.

Like the wireless power transmission device S1, wireless power transmission device S3 comprises wireless power feeding device 100 and wireless power receiving device 200. Wireless power feeding device 100 is provided with power supply 110, power inverter circuit 120 and power feeding side resonant circuit 130. And wireless power receiving device 200 is provided with power receiving side resonant circuit 210, rectifier circuit 220, power receiving side voltage detecting portion 230, short circuit 540 and controlling circuit 250. The configurations of power supply 110, power inverter circuit 120, power feeding side resonant circuit 130, power receiving side resonant circuit 210, rectifier circuit 220, power receiving side voltage detecting portion 230 and controlling circuit 250 are the same as that of wireless power transmission device S1 according to the first embodiment. The present embodiment is different from the first embodiment in that short circuit 540 is provided instead of short circuit 240 in the wireless power transmission device S1 according to the first embodiment. Hereinafter, differences from the first embodiment will be mainly described.

Similarly to the short circuit 240, short circuit 540 has a function of causing the two ends of power receiving coil L2 to be short-circuited when the output voltage of rectifier circuit 220 detected by power receiving side voltage detecting portion 230 exceeds a preset reference voltage value. Specifically, short circuit 540 has a function of causing diode D2 and diode D4 to be short-circuited. In this short circuit 540, a short circuit operation is performed based on the driving signal SG6 transmitted from controlling circuit 250. As shown in FIG. 7, short circuit 540 is composed of rectifying elements D5 and D6 and switching element SW13. Further, the configuration of rectifying elements D5 and D6 are the same as that of wireless power transmission device S1 according to the first embodiment.

Switching element SW13 is connected between the output portion of power receiving side resonant circuit 210 and the output portion of rectifier circuit 220. More specifically, switching element SW13 is connected to the cathodes of rectifying elements D5 and D6, respectively. In the present embodiment, switching element SW13 is composed of a MOS-FET. Therefore, the cathode of rectifying element D5 and the cathode of D6 are connected in parallel with the drain of switching element SW13. Switching element SW13 has a function of turning on/off in response to driving signal SG6 from controlling circuit 250. That is, when switching element SW13 is turned on, diodes D2 and D4 are short-circuited, and no voltage is generated in rectifier circuit 220. Conversely, when switching element SW13 is turned off, rectifier circuit 220 functions as a full-wave rectifier circuit in which four diodes D1 to D4 are connected in a full bridge connection. In the present embodiment, a MOS-FET is used as switching element SW13. However, it is not limited to this, and it may be an element such as an IGBT, for example.

Figure 8A:
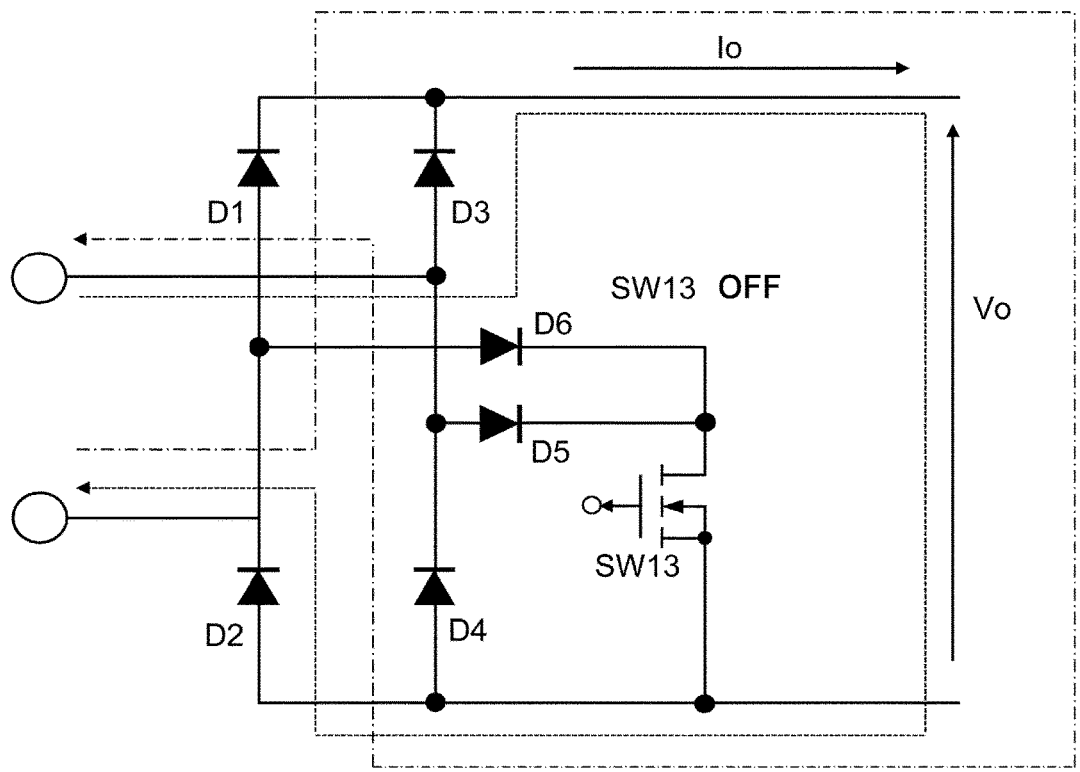
FIG. 8a is a partially enlarged view of a circuit configuration diagram showing a current path when the switching element of the rectifier circuit in FIG. 7 is turned off.
Figure 8B:
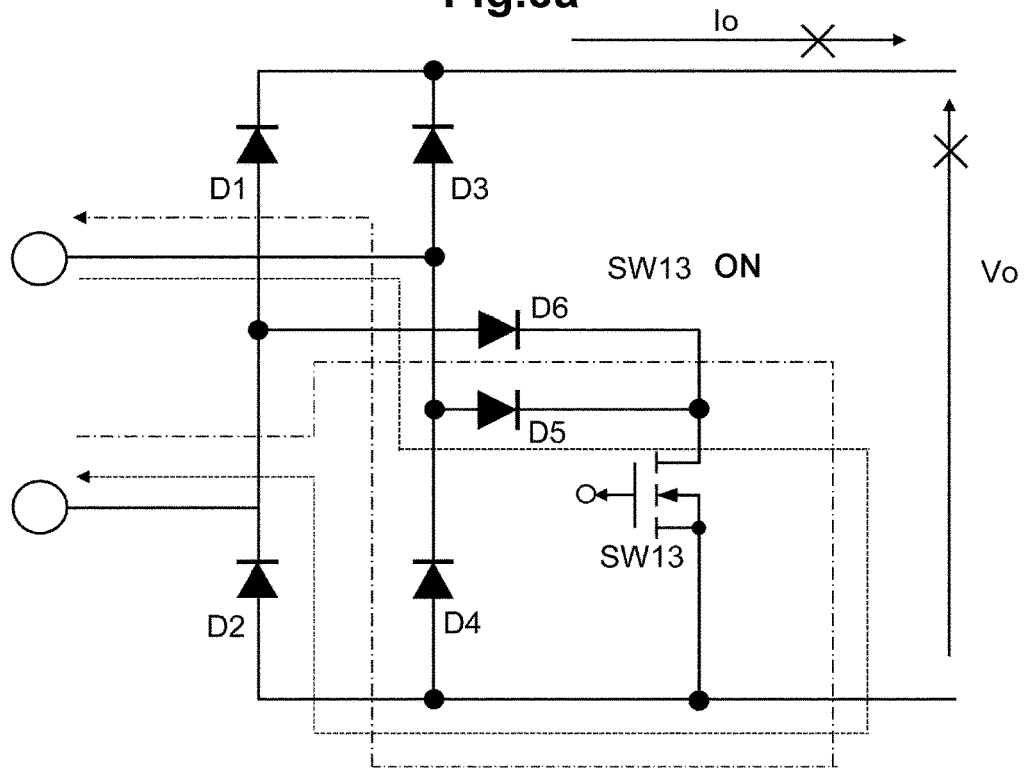

Next, with reference to FIGS. 8a and 8b, a current path in the case that switching element SW13 of short circuit 540 is ON and in the case that switching element SW13 is OFF in wireless power transmission device S3 according to the second embodiment of the present invention will be described. FIG. 8a is a diagram showing a current path flowing in the rectifier circuit and the short circuit when the switching element of rectifier circuit in FIG. 7 is turned off. FIG. 8b is a diagram showing a current path flowing in the rectifier circuit and the short circuit when the switching element of the short circuit in FIG. 7 is turned on.

First, the OFF state of switching element SW13 will be described. As shown in FIG. 8a, in the current paths of the alternating current flowing through rectifier circuit 220, one of the current paths is a path starting from power receiving coil L2 and returning back through diode D1, smoothing capacitor C2 and load RL, diode D4. And the other one of the current paths is a path starting from power receiving coil L2 and returning back through diode D3, smoothing capacitor C2 and load RL, diode D2. Further, in the current path of short circuit 540, the return of the current to the input portion of rectifier circuit 220 is cut off by diodes D5 and D6. Further, since a direct current voltage full-wave rectified by diodes D5 and D6 is applied to switching element SW13, the parasitic capacitance of switching element SW13 can be regarded as equivalent to be insulating, so that the discharge of the parasitic capacitance of switching element SW13 will not be performed, and there is no current path flowing through switching element SW13 either. That is, there is no current path flowing from the input portion of rectifier circuit 220 to short circuit 540.

Subsequently, the ON state of switching element SW13 will be described. As shown in FIG. 8b, in the current paths of the alternating current flowing through rectifier circuit 220, one of the current paths is a path starting from power receiving side resonant circuit 210 and returning back through diode D5, switching element SW13 and diode D2. And the other one of the current paths is a path starting from power receiving side resonant circuit 210 and returning back through diode D6, switching element SW13, and diode D4. In this case, since no current flows through the output of rectifier circuit 220, it is possible to protect the circuit elements deposed in a stage following rectifier circuit 220 from malfunction.

As described above, in wireless power transmission device S3 according to the present embodiment, when the value of the output voltage detected by power receiving side voltage detecting portion 230 exceeds a preset reference voltage value, switching device SW13 of short circuit 540 are operated. Therefore, the two ends of power receiving coil L2 of power receiving side resonant circuit 210 are short-circuited. As a result, the generated overvoltage will not be output to the stage following power receiving side resonant circuit 210, and the circuit elements deposed in a stage following power receiving side resonant circuit 210 can be protected. In addition, since rectifying elements D5 and D6, inserted between the output portion of power receiving side resonant circuit 210 and switching element SW13, are provided, the current path to the parasitic capacitance of switching elements SW5 and SW6 is cut off and discharge of the parasitic capacitance is suppressed. As a result, generation of power loss due to reactive power during normal operation can be suppressed.

Further, in wireless power transmission device S3 according to the present embodiment, since the number of switching elements constituting short circuit 540 is one, it is possible to save space and simplify the device.

The Third Embodiment

Figure 9:
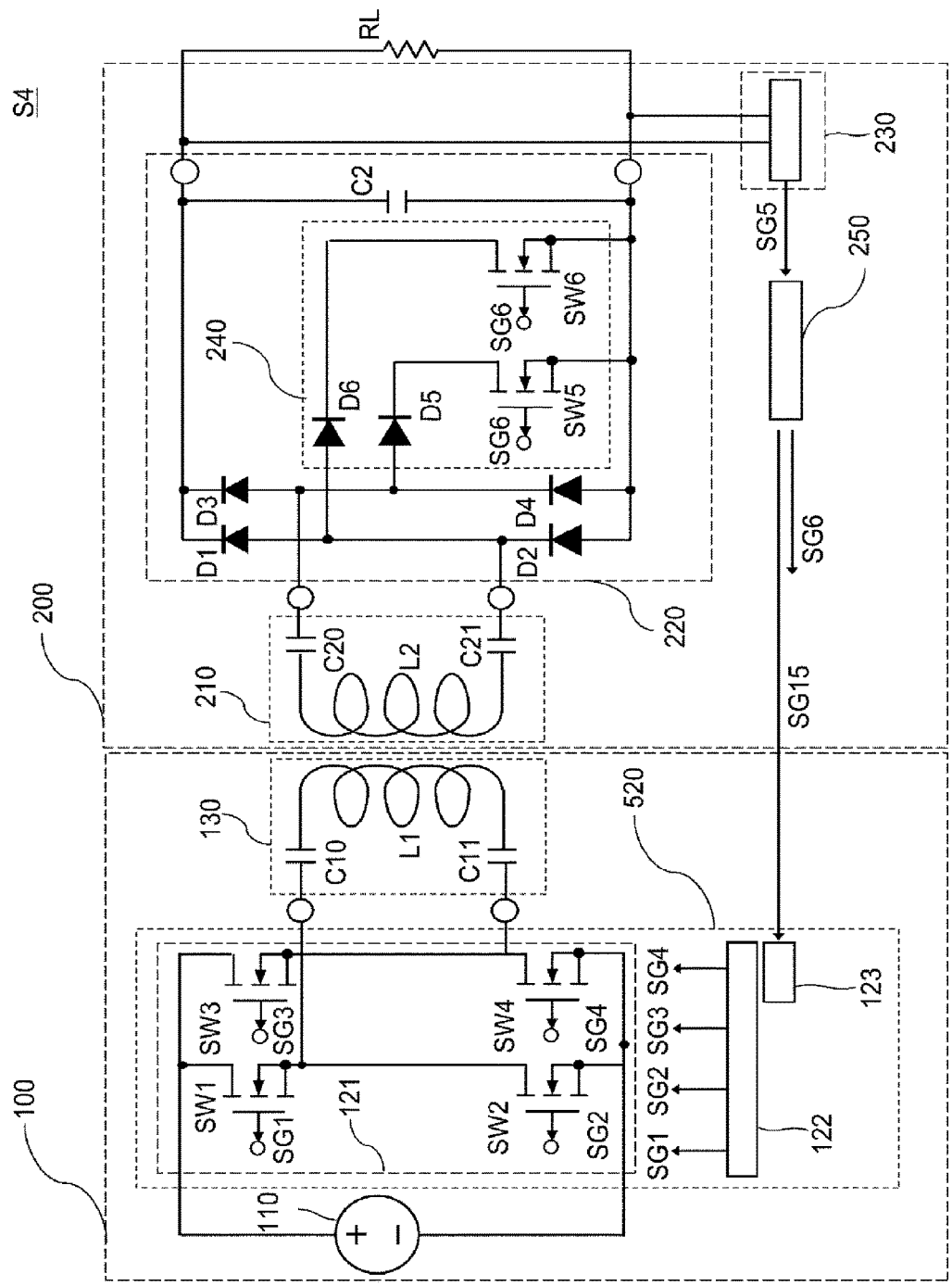
FIG. 9 is a circuit configuration diagram showing a wireless power transmission device according to the third embodiment of the present invention together with a load.

First, with reference to FIG. 9, the configuration of wireless power transmission device S4 according to the third embodiment of the present invention will be described. FIG. 9 is a circuit configuration diagram showing a wireless power transmission device according to the third embodiment of the present invention together with a load.

Similar to wireless power transmission device S1 according to the first embodiment, wireless power transmission device S4 comprises wireless power feeding device 100 and wireless power receiving device 200. Wireless power feeding device 100 is provided with power supply 110, power inverter circuit 120 and power feeding side resonant circuit 130. And wireless power receiving device 200 is provided with power receiving side resonant circuit 210, rectifier circuit 220, power receiving side voltage detecting portion 230, short circuit 240 and controlling circuit 250. The configurations of power supply 110, power inverter circuit 120, power feeding side resonant circuit 130, power receiving side resonant circuit 210, rectifier circuit 220, power receiving side voltage detecting portion 230 and controlling circuit 250 are the same as wireless power transmission device S1 according to the first embodiment. The present embodiment is different from the first embodiment in that power inverter circuit 620 and controlling circuit 750 are provided instead of power inverter circuit 120 and controlling circuit 250 respectively in wireless power transmission device S1 according to the first embodiment. Hereinafter, differences from the first embodiment will be mainly described.

As shown in FIG. 9, power inverter circuit 620 comprises power inverter portion 121, switch driving portion 122 and power controlling portion 123. The configurations of power inverter portion 121 and switch driving portion 122 are the same as that of wireless power transmission device S1 according to the first embodiment.

Power controlling portion 123 has a function of stopping the function of power inverter circuit 620 and stopping the power feeding operation of wireless power feeding device 100. Specifically, the operation of power inverter portion 121 is stopped upon receiving stop signal SG 15 provided from controlling circuit 750 of wireless power receiving device 200 to be described later. In the present embodiment, switch driving portion 122 and power controlling portion 123 are configured separately, but either one may have the functions of both.

Similar to controlling circuit 250, controlling circuit 750 controls the operation of short circuit 240. In the present embodiment, in addition to the above function, it also has a function of controlling power controlling portion 123. Specifically, upon reception of output signal SG5 from power receiving side voltage detecting portion 230, it provides driving signal SG6 to switching elements SW5 and SW6 so as to turn on switching elements SW5 and SW6, and further transmits stop signal SG15 to power controlling portion 123 at the same time as or immediately after driving signal SG6 is provided to switching elements SW5 and SW6, so as to stop power feeding operation of wireless power feeding device 100.

Figure 10:
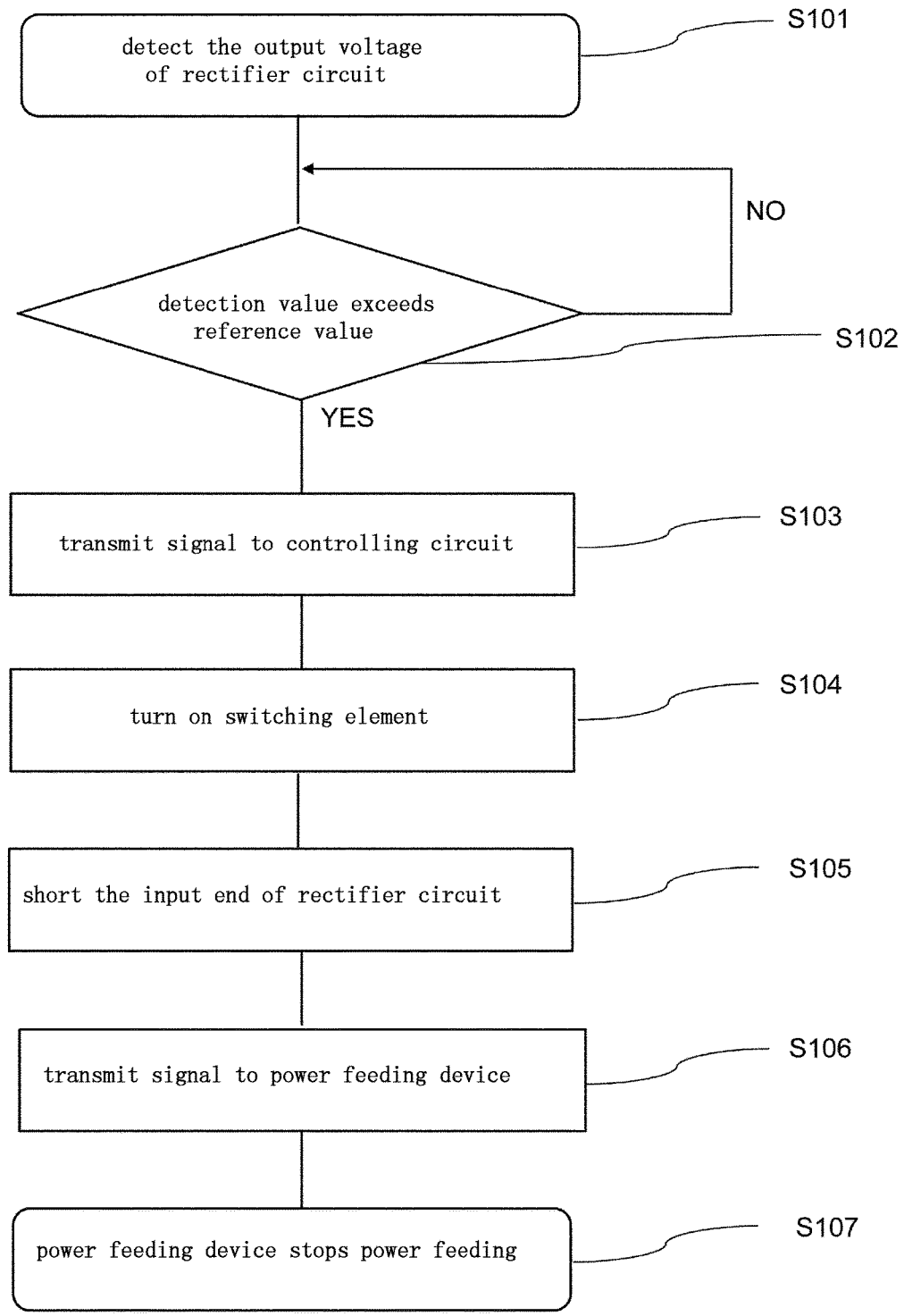
FIG. 10 is a flowchart showing a protection operation of a wireless power transmission device according to the third embodiment of the present invention.

Next, with reference to the flowchart of FIG. 10, the protection operation during the malfunction of wireless power transmission device S4 according to the present embodiment will be described in detail. FIG. 10 is a flowchart showing the protection operation of the wireless power transmission device according to the third embodiment of the present invention.

In FIG. 10, steps S101 to S105 are the same operations as those of the first embodiment, so that the explanation is omitted here.

Controlling circuit 750 transmits stop signal SG15 to power controlling portion 123 of wireless power feeding device 100 at the same time as or immediately after switching elements SW5 and SW6 are controlled to be turned on (Step S106).

Subsequently, upon receiving stop signal SG15, power controlling portion 123 stops the operation of power inverter circuit 620 and stops the power feeding operation of wireless power feeding device 100 (Step S107).

As described above, in wireless power transmission device S4 according to the present embodiment, when the value of the output voltage detected by power receiving side voltage detecting portion 230 exceeds a preset reference voltage value, switching devices SW5 and SW6 of short circuit 240 are operated. Therefore, diodes D2 and D4 of rectifier circuit 220 are short-circuited. As a result, the generated overvoltage will not be output to the stage following power receiving side resonant circuit 210, and the circuit elements deposed in a stage following power receiving side resonant circuit 210 can be protected. In addition, since rectifying elements D5 and D6 inserted between the output portion of power receiving side resonant circuit 210 and switching elements SW5 and SW6 are provided, the current path to the parasitic capacitance of switching elements SW5 and SW6 is cut off, and discharge of the parasitic capacitance is suppressed. As a result, generation of power loss due to reactive power during normal operation can be suppressed.

Furthermore, in wireless power transmission device S4 according to the present embodiment, controlling circuit 750 is configured to transmit stop signal SG15 for stopping the power feeding operation to wireless power feeding device 100 at the same time as or immediately after controlling circuit 750 operates switching elements SW5 and SW6. Therefore, when the value of the output voltage detected by power receiving side voltage detecting portion 230 exceeds the preset reference voltage value, the operation of wireless power feeding device 100 is stopped. Therefore, it is possible to protect the circuit elements of the entire wireless power transmission device S4. In addition, since the operation of wireless power feeding device 100 is stopped, the period for applying current to short circuit 240 is suppressed, so that short circuit 240 can be protected.

The Fourth Embodiment

Figure 11:
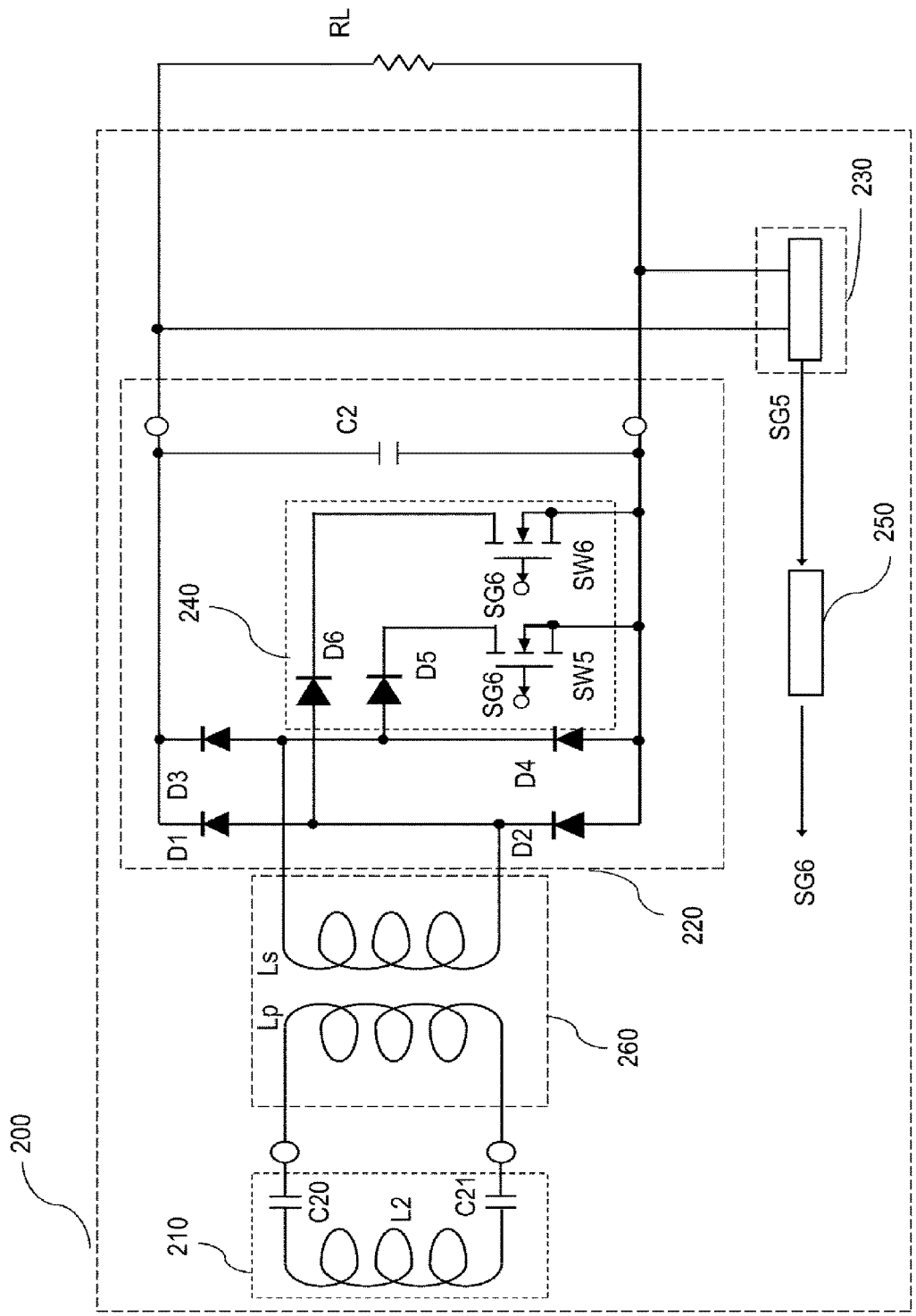
FIG. 11 is a circuit configuration diagram showing a wireless power receiving device in the wireless power transmission device according to the fourth embodiment of the present invention together with a load.

Next, with reference to FIG. 11, the configuration of the wireless power transmission device according to the fourth embodiment of the present invention will be described. FIG. 11 is a circuit configuration diagram showing a wireless power receiving device in the wireless power transmission device according to the fourth embodiment of the present invention together with a load.

Similar to wireless power transmission device S1 according to the first embodiment, the wireless power transmission device comprises wireless power feeding device 100 and wireless power receiving device 200. Herein, wireless power feeding device 100 in the wireless power transmission device according to the fourth embodiment is the same as wireless power feeding device 100 in wireless power transmission device S1 according to the first embodiment, and thus the description thereof will be omitted. Wireless power receiving device 200 in the wireless power transmission device according to the fourth embodiment is provided with power receiving side resonant circuit 210, transforming circuit 260, rectifier circuit 220, power receiving side voltage detecting portion 230, short circuit 240 and controlling circuit 250. The configurations of power receiving side resonant circuit 210, rectifier circuit 220, power receiving side voltage detecting portion 230, short circuit 240 and controlling circuit 250 are the same as that of wireless power transmission device S1 according to the first embodiment. The present embodiment is different from the first embodiment in that wireless power receiving device 200 is provided with transforming circuit 260. Hereinafter, differences from the first embodiment will be mainly described.

Transforming circuit 260 is inserted between the output portion of power receiving side resonant circuit 210 and the input portion of rectifier circuit 220. Transforming circuit 260 converts the voltage output from power receiving side resonant circuit 210 to a desired value and outputs it to rectifier circuit 220. In the present embodiment, transforming circuit 260 is a transformer having primary winding Lp and secondary winding Ls. Primary winding Lp and secondary winding Ls are formed using a litz wire obtained by twisting a plurality of thin conductor strands or a single wire. Herein, primary winding Lp and secondary winding Ls are magnetically coupled, and the voltage applied to primary winding Lp and the voltage applied to secondary winding Ls can be converted by the turns ratio between primary winding Lp and secondary winding Ls. That is, transforming circuit 260 has a function of converting the voltage output from power receiving side resonant circuit 210 to a voltage corresponding to the turns ratio of primary winding Lp and secondary winding Ls, and outputting the voltage to rectifier circuit 220. In the present embodiment, one output end of power receiving side resonant circuit 210 is connected to one end of primary winding Lp, and one output end of power receiving side resonant circuit 210 is connected to the other end of primary winding Lp. Further, one end of secondary winding Ls is connected to the midpoint between the anode of diode D1 and the cathode of diode D2 and the other end of secondary winding Ls is connected to the midpoint of the anode of diode D3 and the cathode of diode D4.

In the present embodiment, transforming circuit 260 is inserted between the output portion of power receiving side resonant circuit 210 and the input portion of rectifier circuit 220. Therefore, when switching elements SW5 and SW6 of short circuit 240 are OFF, in the current paths of the alternating current flowing through rectifier circuit 220, one of the current paths is a path starting from power receiving coil L2 and returning back through transforming circuit 260, diode D1, smoothing capacitor C2 and load RL, diode D4, transforming circuit 260. The other current path is a path starting from power receiving coil L2 and returning back through transforming circuit 260, diode D3, smoothing capacitor C2 and load RL, diode D2, transforming circuit 260. Further, when switching elements SW5 and SW6 of short circuit 240 are ON, in the current paths of the alternating current flowing through rectifier circuit 220, one of the current paths is a path starting from power receiving coil L2 and returning back through transforming circuit 260, diode D5, switching element SW5, diode D2, and transforming circuit 260. The other current path is a path starting from power receiving coil L2 and returning back through transforming circuit 260, diode D6 switching element SW6, diode D4, and transforming circuit 260.

As described above, the wireless power transmission device according to the present embodiment is further provided with transforming circuit 260 between the output portion of power receiving side resonant circuit 210 and the input portion of rectifier circuit 220. Therefore, it is possible to protect the circuit elements when an overvoltage occurs and to output a desired voltage/current from one power receiving side resonant circuit 210 by changing the transformation ratio of transforming circuit 260 during normal operations.

The Fifth Embodiment

Figure 12:
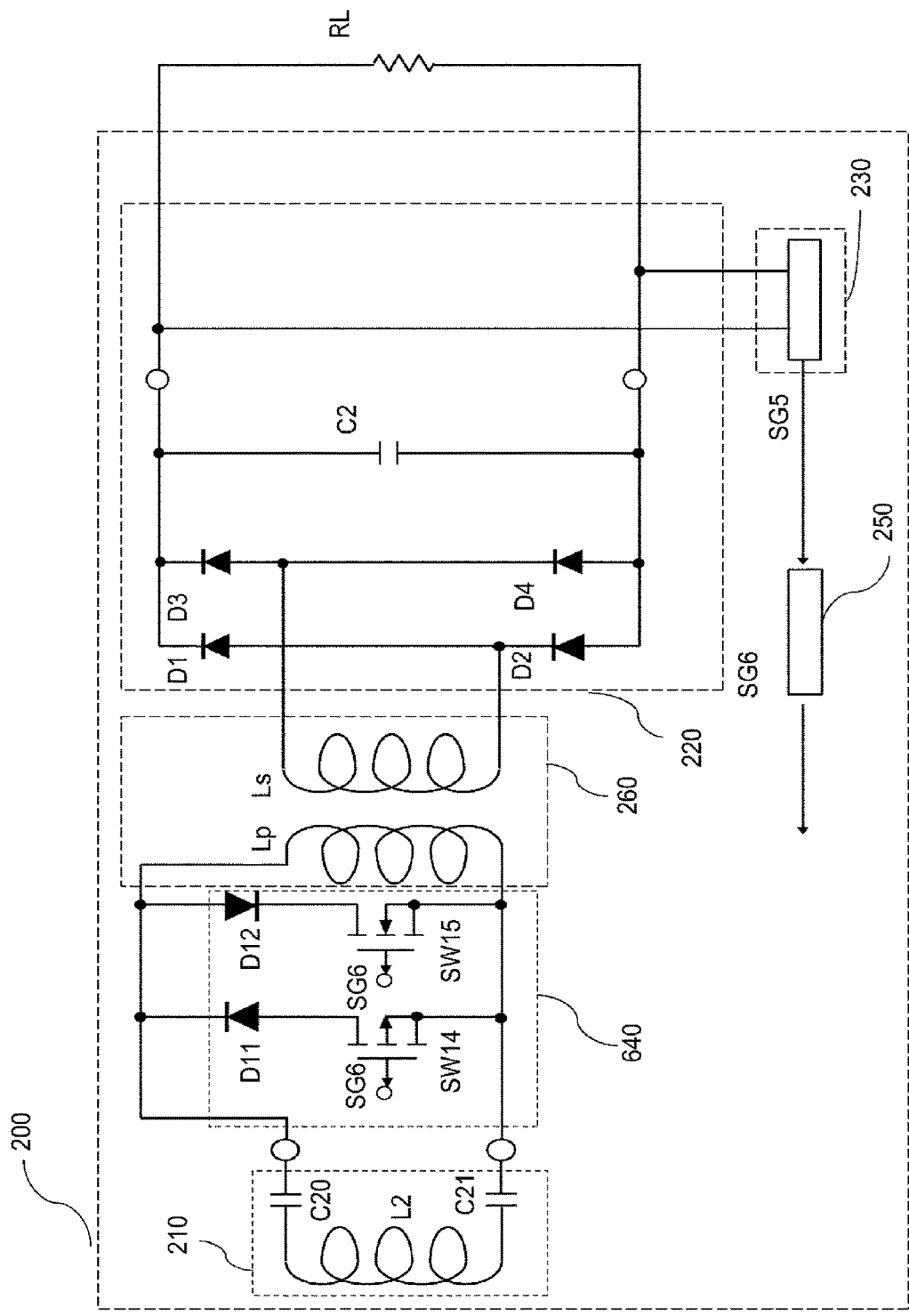
FIG. 12 is a circuit configuration diagram showing a wireless power receiving device in the wireless power transmission device according to the fifth embodiment of the present invention together with a load.

Next, with reference to FIG. 12, the configuration of the wireless power transmission device according to the fifth embodiment of the present invention will be described. FIG. 12 is a circuit configuration diagram showing a wireless power receiving device in the wireless power transmission device according to the fifth embodiment of the present invention together with a load.

Similar to the wireless power transmission device according to the fourth embodiment, the wireless power transmission device according to the fifth embodiment comprises wireless power feeding device 100 and wireless power receiving device 200. Wireless power feeding device 100 in the wireless power transmission device according to the fifth embodiment is the same as wireless power feeding device 100 in the wireless power transmission device according to the fourth embodiment, and thus the description thereof will be omitted. Wireless power receiving device 200 in the wireless power transmission device according to the fourth embodiment is provided with power receiving side resonant circuit 210, transforming circuit 260, rectifier circuit 220, power receiving side voltage detecting portion 230, short circuit 640 and controlling circuit 250. The configurations of power receiving side resonant circuit 210, transforming circuit 260, rectifier circuit 220, power receiving side voltage detecting portion 230, and controlling circuit 250 are the same as that of wireless power transmission device according to the fourth embodiment. The present embodiment is different from the fourth embodiment in that wireless power receiving device 200 is provided with short circuit 640 instead of short circuit 240. Hereinafter, differences from the fourth embodiment will be mainly described.

Short circuit 640 has a function of causing the two ends of power receiving coil L2 to be short-circuited when the output voltage of rectifier circuit 220 detected by power receiving side voltage detecting portion 230 exceeds a preset reference voltage value. Specifically, short circuit 640 has a function of causing short circuited between power receiving side resonant capacitor C20 and power receiving side resonant capacitor C21. In this short circuit 640, a short circuit operation is performed based on driving signal SG6 transmitted from controlling circuit 250. Short circuit 640 is composed of switching elements SW14 and SW15 and rectifying elements D11 and D12.

Switching elements SW14 and SW15 are connected between the output portion of power receiving side resonant circuit 210 and the output portion of rectifier circuit 220. More specifically, switching elements SW14 and SW15 are connected in parallel between the output portion of power receiving side resonant circuit 210 and the input portion of transforming circuit 260. Switching elements SW14 and SW15 have a function of turning on/off in response to driving signal SG6 received from controlling circuit 250 to be described later. That is, when the switching elements SW14 and SW15 are turned on, the two ends of the output portion of power receiving side resonant circuit 210 are short-circuited, and no voltage is generated in rectifier circuit 220. Conversely, when switching elements SW14 and SW15 are turned off, transforming circuit 260 converts the voltage output from power receiving side resonant circuit 210 to a desired value and outputs it to rectifier circuit 220, and rectifier circuit 220 functions as a full-wave rectifier circuit in which the four diodes D1 to D4 are connected in a full bridge connection. Although MOS-FETs are used as the switching elements SW14 and SW15 in the present embodiment, the switching elements SW14 and SW15 are not limited to this, and may be elements such as IGBTs or the like, for example.

Rectifying elements D11 and D12 are inserted between the output portion of power receiving side resonant circuit 210 and switching elements SW14 and SW15. As rectifying elements D11 and D12, diodes can be listed. In the present embodiment, rectifying element D11 is connected in series with switching element SW14. The anode of rectifying element D11 is connected to the drain of switching element SW14, and the cathode of rectifying element D11 is connected to the output portion of power receiving side resonant circuit 210, i.e., power receiving side resonant capacitor C20. Rectifying element D12 is connected in series with switching element SW15. The anode of rectifying element D12 is connected to the output portion of power receiving side resonant circuit 210, i.e., power receiving side resonant capacitor C20, and the cathode of rectifying element D12 is connected to the drain of switching element SW15.

In the present embodiment, short circuit 640 is inserted between the output portion of power receiving side resonant circuit 210 and the input portion of transforming circuit 260. Therefore, when switching elements SW14 and SW15 of short circuit 640 are OFF, in the current paths of the alternating current flowing through rectifier circuit 220, one of the current paths is a path starting from power receiving coil L2 and returning back through transforming circuit 260, diode D1, smoothing capacitor C2 and load RL, diode D4, transforming circuit 260. The other current path is a path starting from power receiving coil L2 and returning back through transforming circuit 260, diode D3, smoothing capacitor C2 and load RL, diode D2, transforming circuit 260. Further, when switching elements SW14 and SW15 of short circuit 640 are ON, in the current paths of the alternating current flowing through rectifier circuit 220, one of the current paths is a path starting from power receiving coil L2 and returning back through switching element SW14 and diode D11. The other current path is a path starting from power receiving coil L2 and returning back through diode D12 and switching element SW15.

As described above, the wireless power transmission device according to the present embodiment is further provided with transforming circuit 260 between the output portion of power receiving side resonant circuit 210 and the input portion of rectifier circuit 220. Therefore, it is possible to protect the circuit elements when an overvoltage occurs and to output a desired voltage/current from one power receiving side resonant circuit 210 by changing the transformation ratio of transforming circuit 260 during normal operations. Further, in the wireless power transmission device according to the present embodiment, short circuit 640 is inserted between the output portion of power receiving side resonant circuit 210 and the input portion of transforming circuit 260, thus, it is possible to protect the circuit elements deposed in a stage following transforming circuit 260 when an overvoltage occurs.

The Sixth Embodiment

Figure 13:
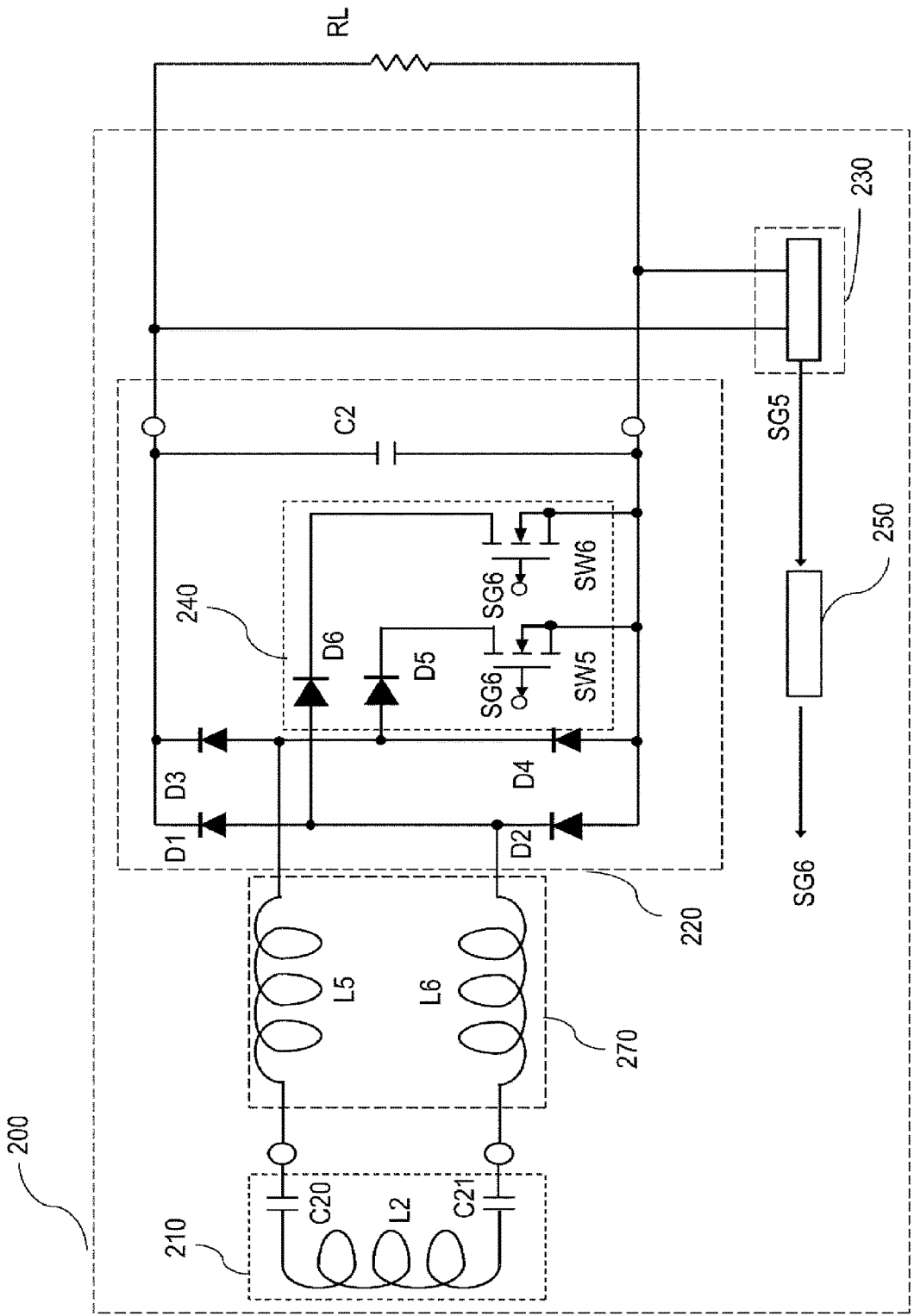
FIG. 13 is a circuit configuration diagram showing a wireless power receiving device in the wireless power transmission device according to the sixth embodiment of the present invention together with a load.

Next, with reference to FIG. 13, the configuration of the wireless power transmission device according to the sixth embodiment of the present invention will be described. FIG. 13 is a circuit configuration diagram showing a wireless power receiving device in the wireless power transmission device according to the fourth embodiment of the present invention together with a load.

Similar to wireless power transmission device S1 according to the first embodiment, the wireless power transmission device according to the sixth embodiment comprises wireless power feeding device 100 and wireless power receiving device 200. Herein, wireless power feeding device 100 in the wireless power transmission device according to the sixth embodiment is the same as wireless power feeding device 100 in wireless power transmission device S1 according to the first embodiment, and thus the description thereof will be omitted. Wireless power receiving device 200 in the wireless power transmission device according to the sixth embodiment is provided with power receiving side resonant circuit 210, inductor circuit 270, rectifier circuit 220, power receiving side voltage detecting portion 230, short circuit 240 and controlling circuit 250. The configurations of power receiving side resonant circuit 210, rectifier circuit 220, power receiving side voltage detecting portion 230, short circuit 240 and controlling circuit 250 are the same as that of wireless power transmission device S1 according to the first embodiment. The present embodiment is different from the first embodiment in that wireless power receiving device 200 is provided with inductor circuit 270. Hereinafter, differences from the first embodiment will be mainly described.

Inductor circuit 270 is inserted between the output portion of power receiving side resonant circuit 210 and the input portion of rectifier circuit 220. In the present embodiment, inductor circuit 270 comprises inductors L5 and L6. Inductors L5 and L6 have a function as a large resistance in a frequency equal to or higher than a certain frequency, and have a function of eliminating common mode noise. As a result, inductors L5 and L6 have a function of attenuating or isolating the superimposed noise on the output from power receiving side resonant circuit 210 and outputting to rectifier circuit 220. In the present embodiment, one end of inductor L5 is connected to one output end of power receiving side resonant circuit 210 and the other end of inductor L5 is connected to the midpoint of the anode of diode D3 and cathode of diode D4. Further, one end of inductor L6 is connected to the other output end of power receiving side resonant circuit 210 and the other end of inductor L6 is connected to the midpoint of the anode of diode D1 and cathode of diode D2. As examples of the inductors L5 and L6, a normal mode choke coil for suppressing noise of normal mode and a common mode choke coil for suppressing noise of common mode can be listed.

In the present embodiment, inductor circuit 270 is inserted between the output portion of power receiving side resonant circuit 210 and the input portion of rectifier circuit 220. Therefore, when switching elements SW5 and SW6 of short circuit 240 are OFF, in the current paths of the alternating current flowing through rectifier circuit 220, one of the current paths is a path starting from power receiving coil L2 and returning back through inductor L6, diode D1, smoothing capacitor C2 and load RL, diode D4, and inductor L5. The other current path is a path starting from power receiving coil L2 and returning back through inductor L5, diode D3, smoothing capacitor C2 and load RL, diode D2, and inductor L6. Further, when switching elements SW5 and SW6 of short circuit 240 are ON, in the current paths of the alternating current flowing through rectifier circuit 220, one of the current paths is a path starting from power receiving coil L2 and returning back through inductor L5, diode D5, switching element SW5, diode D2 and inductor L6. The other current path is a path starting from power receiving coil L2 and returning back through inductor L6, diode D6, switching element SW6, diode D4 and inductor L5.

As described above, the wireless power transmission device according to the present embodiment is further provided with inductor circuit 270 between the output portion of power receiving side resonant circuit 210 and the input portion of rectifier circuit 220. Therefore, it is possible to protect the circuit elements when an overvoltage occurs and to suppress noise during normal operations.

Further, the characteristic configuration and function of the wireless power transmission device according to the above-described sixth embodiment may be applied to the wireless power transmission device according to the fourth and fifth embodiments.

DESCRIPTION OF REFERENCE NUMERALS

S1~S4 . . . wireless power transmission device
100 . . . wireless power feeding device
110 . . . power supply
120, 620 . . . power inverter circuit
121 . . . power inverter portion
122 . . . switch driving portion
123 . . . power controlling portion
130 . . . power feeding side resonant circuit
200 . . . wireless power receiving device
210 . . . power receiving side resonant circuit
220 . . . rectifier circuit
230 . . . power receiving side voltage detecting portion
240, 540, 640 . . . short circuit
250, 750 . . . controlling circuit
260 . . . transforming circuit
270 . . . inductor circuit
300 . . . wireless power feeding device
310 . . . power supply
320 . . . power inverter circuit
321 . . . power inverter portion
322 . . . switch driving portion
330 . . . power feeding side resonant circuit
400 . . . wireless power receiving device
410 . . . power receiving side resonant circuit 420 . . . rectifier circuit
430 . . . power receiving side voltage detecting portion
440 . . . short circuit
450 . . . controlling circuit
SW1~SW15 . . . switching element
C2, C4 . . . smoothing capacitor
C10, C11, C30, C31 . . . power feeding side resonant capacitor
C20, C21, C40, C41 . . . power receiving side resonant capacitor
L1, L3 . . . power feeding coil
L2, L4 . . . power receiving coil
Lp . . . primary winding
Ls . . . secondary winding
L5, L6 . . . inductor
D1~D12 . . . rectifying element (diode)
SG1~SG4, SG7~SG10 . . . SW controlling signal
SG5, SG13 . . . output signal
SG6, SG14 . . . driving signal
SG15 . . . stop signal

What is claimed is:

1. A wireless power receiving device, for wirelessly receiving electric power from a wireless power feeding device, comprising:
   a power receiving side resonant circuit provided with a power receiving coil wirelessly receiving electric power from a power feeding side and a power receiving side resonant capacitor connected to the power receiving coil;
   a rectifier circuit in which the electric power received by the power receiving coil is rectified to be output to a load;
   a power receiving side voltage detecting portion for detecting an output voltage of the rectifier circuit;
   a short circuit provided with a switching element connected between an output portion of the power receiving side resonant circuit and an output portion of the rectifier circuit, and a rectifying element inserted between the output portion of the power receiving side resonant circuit and the switching element; and
   a controlling circuit which operates the switching element when a value of the output voltage detected by the power receiving side voltage detecting portion exceeds a preset reference voltage value.

2. The wireless power receiving device of claim 1, wherein,
   the rectifier circuit is provided with a bridge type circuit in which four diodes are full bridge connected and a smoothing capacitor which is connected in parallel with the bridge type circuit.

3. The wireless power receiving device of claim 2, wherein,
   an inductor circuit is further provided between the output portion of the power receiving side resonant circuit and an input portion of the rectifier circuit.

4. The wireless power receiving device of claim 2, wherein,
   the controlling circuit transmits a stop signal for stopping a power feeding operation to the wireless power feeding device at the same time as or immediately after the controlling circuit operates the switching element.

5. The wireless power receiving device of claim 4, wherein,
   a transforming circuit is further provided between the output portion of the power receiving side resonant circuit and an input portion of the rectifier circuit.

6. The wireless power receiving device of claim 5, wherein,
   an inductor circuit is further provided between the output portion of the power receiving side resonant circuit and an input portion of the rectifier circuit.

7. The wireless power receiving device of claim 4, wherein,
   an inductor circuit is further provided between the output portion of the power receiving side resonant circuit and an input portion of the rectifier circuit.

8. The wireless power receiving device of claim 2, wherein,
   a transforming circuit is further provided between the output portion of the power receiving side resonant circuit and an input portion of the rectifier circuit.

9. The wireless power receiving device of claim 8, wherein,
   an inductor circuit is further provided between the output portion of the power receiving side resonant circuit and an input portion of the rectifier circuit.

10. The wireless power receiving device of claim 1, wherein,
    the controlling circuit transmits a stop signal for stopping a power feeding operation to the wireless power feeding device at the same time as or immediately after the controlling circuit operates the switching element.

11. The wireless power receiving device of claim 10, wherein,
    a transforming circuit is further provided between the output portion of the power receiving side resonant circuit and an input portion of the rectifier circuit.

12. The wireless power receiving device of claim 11, wherein,
    an inductor circuit is further provided between the output portion of the power receiving side resonant circuit and an input portion of the rectifier circuit.

13. The wireless power receiving device of claim 10, wherein,
    an inductor circuit is further provided between the output portion of the power receiving side resonant circuit and an input portion of the rectifier circuit.

14. The wireless power receiving device of claim 1, wherein,
    a transforming circuit is further provided between the output portion of the power receiving side resonant circuit and an input portion of the rectifier circuit.

15. The wireless power receiving device of claim 14, wherein,
    an inductor circuit is further provided between the output portion of the power receiving side resonant circuit and an input portion of the rectifier circuit.

16. The wireless power receiving device of claim 1, wherein,
    an inductor circuit is further provided between the output portion of the power receiving side resonant circuit and an input portion of the rectifier circuit.

17. A wireless power transmission device comprising the wireless power receiving device of claim 1 and a wireless power feeding device, wherein,
    the wireless power feeding device is provided with a power feeding side resonant circuit and a power inverter circuit, wherein, the power feeding side resonant circuit comprises a power feeding coil for wirelessly feeding power to power receiving side and a power feeding side resonant capacitor connected to the power feeding coil, and the power inverter circuit inverts an input direct current power into an alternating current power and then provides to the power feeding coil.

* * * * *